United States Patent [19]

Ichikawa et al.

[11] Patent Number: 5,663,866

[45] Date of Patent: Sep. 2, 1997

[54] METER MODULE

[75] Inventors: Hiroshi Ichikawa; Yoshiaki Nakayama; Keizo Nishitani; Chiaki Sugiyama; Minoru Kubota; Tatsuo Ikegaya; Masanori Muto; Masaki Oishi; Masahiro Muramatsu; Yasuo Hosoda; Hiroshi Suzuki, all of Shizuoka, Japan

[73] Assignee: Yazaki Corporation, Tokyo, Japan

[21] Appl. No.: 196,944

[22] Filed: Feb. 15, 1994

[30] Foreign Application Priority Data

Feb. 17, 1993 [JP] Japan ..................... 5-028128
Aug. 5, 1993 [JP] Japan ..................... 5-194911
Dec. 27, 1993 [JP] Japan ..................... 5-333752

[51] Int. Cl.⁶ ..................... H02B 1/04
[52] U.S. Cl. ..................... 361/643; 307/10.1; 324/156; 361/641; 361/659; 361/661; 361/668; 361/622; 439/34
[58] Field of Search ..................... 307/10.1; 180/90; 361/601, 622, 627–629, 631, 641, 643, 644, 647, 648, 659, 664–669, 728, 730, 748, 749, 752, 826, 827; 324/156, 157; 296/70; 439/34

[56] References Cited

U.S. PATENT DOCUMENTS 4,564,883  1/1986  Bauer et al. ............. 361/622
4,954,807  9/1990  Fleischer et al. ......... 340/459
5,140,259  8/1992  Aida .................... 324/156

FOREIGN PATENT DOCUMENTS

| 00 65 040 A1 | 11/1982 | European Pat. Off. |
| 28 05 583 A1 | 8/1979 | Germany. |
| 37 36 761 A1 | 5/1989 | Germany. |
| 38 00 572 A1 | 7/1989 | Germany. |
| 43 19 079 A1 | 12/1993 | Germany. |
| 57-38457 | 8/1982 | Japan. |
| 2-45238 | 2/1990 | Japan. |
| 3-122921 | 12/1991 | Japan. |
| 3-273943 | 12/1991 | Japan. |
| 4-266537 | 9/1992 | Japan. |

Primary Examiner—Gregory D. Thompson
Attorney, Agent, or Firm—Armstrong, Westerman, Hattori, McLeland & Naughton

[57] ABSTRACT

An instrument panel with meters/indicating lamps and their drive circuits implemented therein, a centralized control circuit board provided with control circuits for vehicle-mounted electric equipment including the meters/indicating lamps, and an electric junction box for distributing power sources and input/output signals for the vehicle-mounted electric equipment and for integrating ground wires, are gathered and integrally united. Electric wiring and installation of electric instruments such as an instrument panel in the dashboard portion of an automobile are facilitated.

16 Claims, 33 Drawing Sheets

FIG. 7
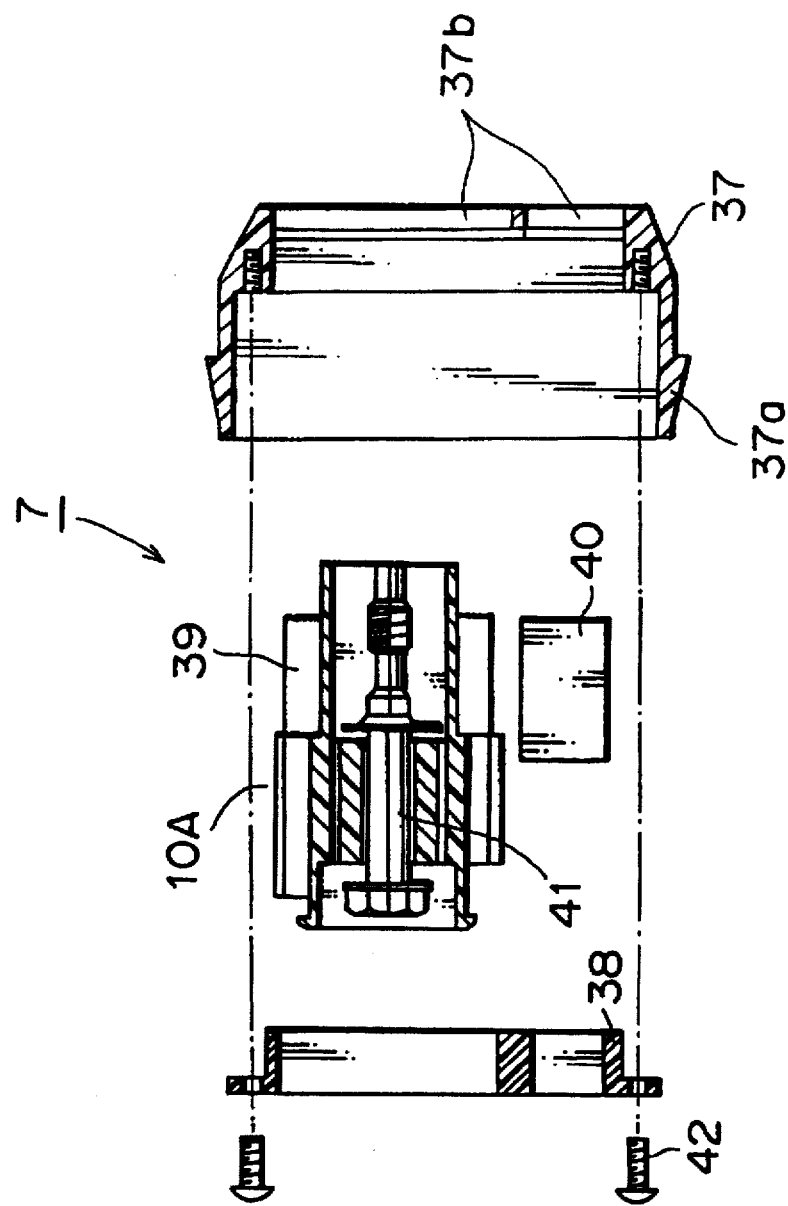
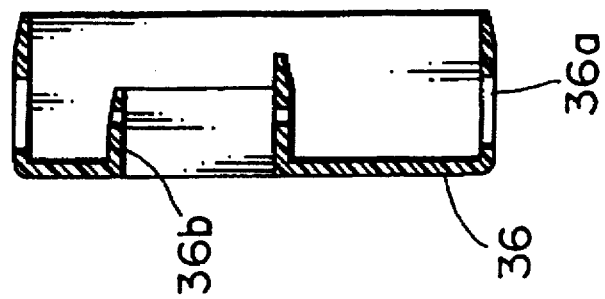

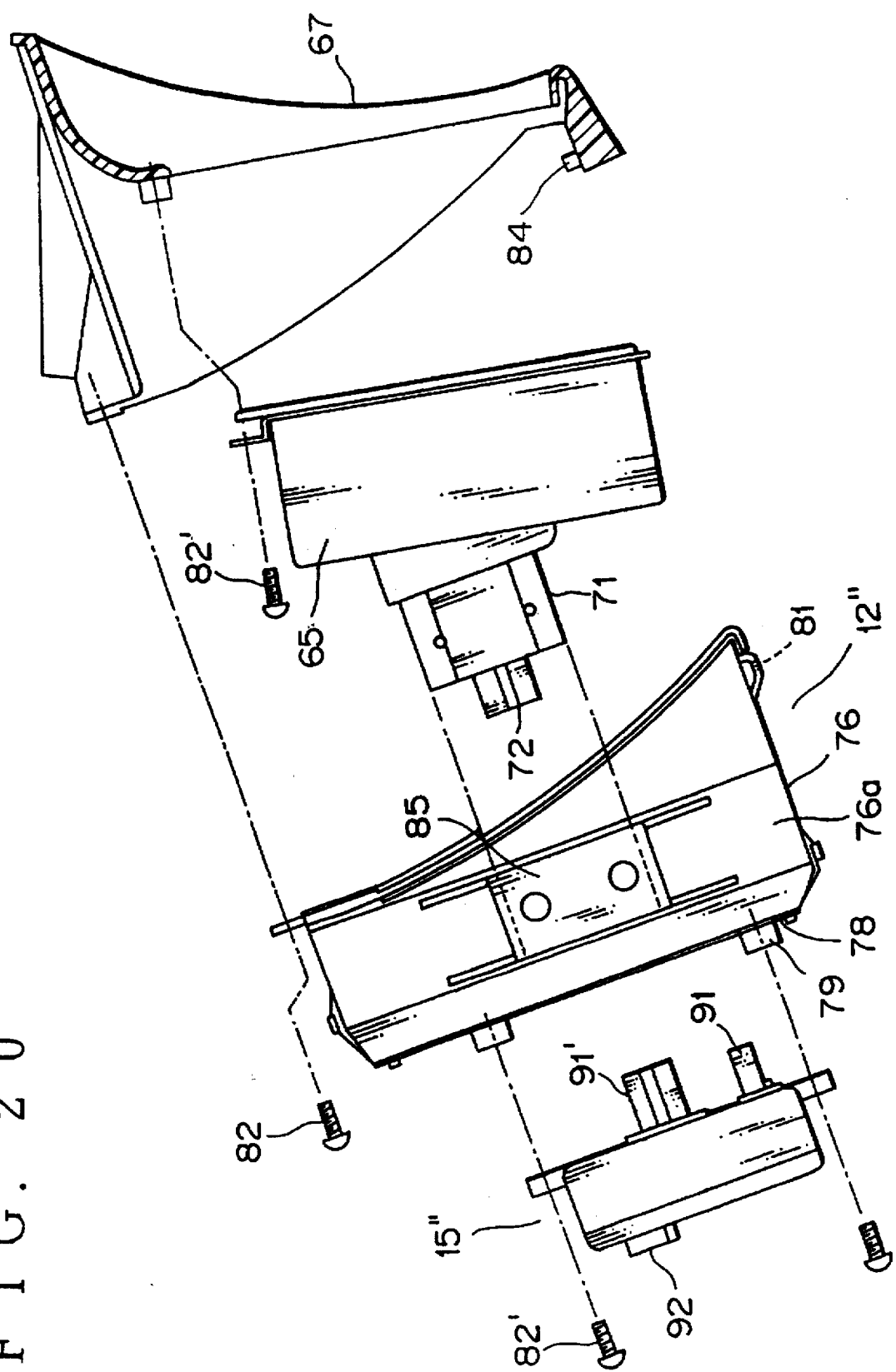

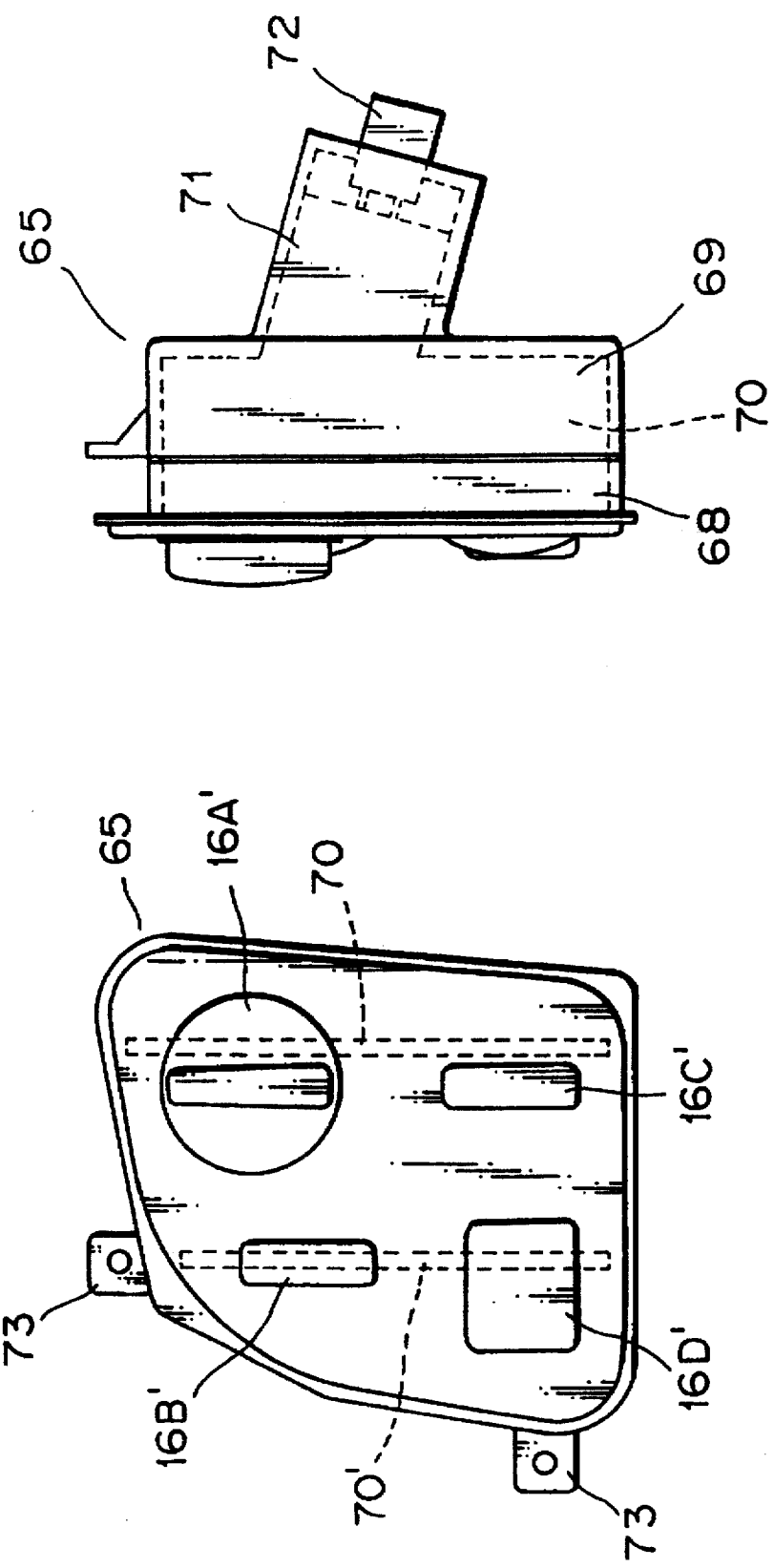

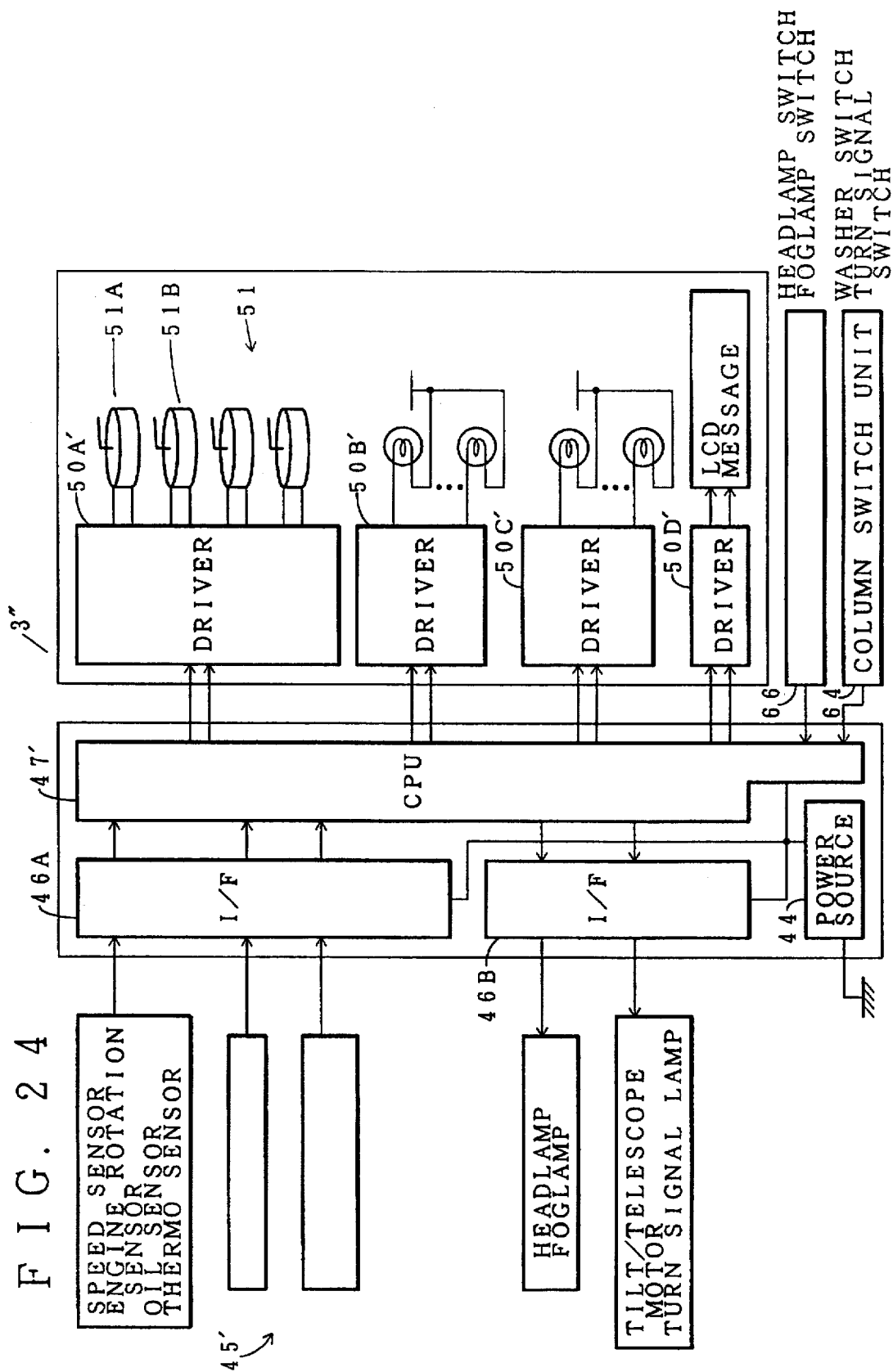

METER MODULE

BACKGROUND OF THE INVENTION

1. Field of the Invention

This invention relates to a meter module that facilitates electric wiring and mounting of electric instruments at the dashboard portion of an automobile.

2. Description of the Prior Art

FIG. 33 shows a conventional wired state of wiring harnesses. A deal of electric equipment is disposed around the dashboard 2 of a vehicle body 1. Therefore, control circuit units 4A", 4B". . . that control the equipment, meters 51, indicator lamps and switches 45 are also gathered. Consequently, the number of wires that constitute a dashboard wiring harness becomes enormous, making the harnesses enlarged and heavy and causing the wired state of the harnesses complicated, resulting in much labor and time required in installation. The maintenance is also made difficult.

Designated 74A is a cowl side wiring harness, 74B an engine room main wiring harness, 74C, 74C floor wiring harnesses, 74D', 74D' door wiring harnesses, and 75A, 75B . . . connections by connectors and the like.

To ease such a situation, it is proposed in Japanese Patent Publication Specification No. Sho 57-38457 that to simplify the wired state of wiring harnesses and prevent their enlargedness, a plurality of electric juntion boxes—which gather therein branch connectons of wiring harnesses and carry a number of circuit-protecting fuses and control relays—are dispersedly arranged at suitable places in an automobile.

FIG. 34 is a wiring diagram of a tail lamp system with such electric junction boxes used. Designated 57A, 57B are tail lamps, 58A, 58B clearance lamps, and 1A an engine room with an engine 59 and a battery (not shown) therein. In the region 1B near the dashboard an instrument panel 100 with a tail lamp alarm lamp 52, a tail relay 55, an electric junction box 101 with a main fuse 56A, a tail fuse 56B and a meter fuse 56C, a lamp disconnection detection relay 102 and a tail switch 45 are arranged.

When the tail switch 48 is put on, the contacts of the tail relay 55 are closed and the current flows through the circuit with the tail fuse 56B to light the lamps 57A, 57B, 58A and 58B. When either one of the lamps 57A and 57B is disconnected, the lamp disconnection detection relay 102 operates and the alarm lamp 52 inside the instrument panel 100 is lighted.

FIG. 35 is a block diagram of the wiring around such electric junction box 101, lamp disconnection detection relay 102 and instrument panel (combination meter) 100 combined with control circuit units 55 such as a speed control relay and integration relay.

Inside the instrument panel 100 a number of meters 51 such as an oil meter, battery meter, speed meter and tachometer, their movements 29 and lamps 52 such as an indicator lamp, alarm lamp and lighting lamp are implemented. The speed meter 51A and the tachometer 51B are respectively provided with control circuits 103A and 103B for their exclusive use. Further, the above-mentioned Control circuit units 55 are also dispersedly arranged. Thus, the power lines and signal lines that connect these are very large in number, and the complicatedness is not still solved by limitingly arranging a small number of electric junction boxes 101.

Under these conditions, it is proposed in Japanese Patent Application Laid-Open Specification No. Hei 2-45238 that to reduce the number of circuits inside an electric junction box and the number of their connecting wires and simplify the wiring harnesses around the dashboard, the internal circuit of an instrument panel include a branch circuit with joints for connection with a wiring harness and the instrument panel take over a part of branch connections of the wiring harness.

Further, in Japanese Patent Application Laid-Open Specification No. Hei 4-266537 a circuit structure is proposed which comprises, as shown in FIG. 36, switches/instruments (not shown) implemented in a cluster 105 at a dashboard portion 104, a flexible printed circuit board 106 glued to the rear surfac of the cluster for forming electric circuits for the switches/instruments, and electronic control substrates 109A–109F dispersedly arranged at terminals of the circuit board 106 with electronic function parts 108 mounted thereon for the memory, operation and the like needed for the electronic control of the switches/instruments.

It is to be noted, however, that if the internal circuit of the instrument panel takes over part of branch circuits of a wiring harness or of an electric junction box, insofar as control circuit units for electric equipment are dispersedly arranged, there is a limit to simplifying the wiring harnesses, making it difficult to cope with the accelerative electronization foreseen in view of the pursuit of safety and comfortableness.

Further, although directly arranging the electric circuits (flexible printed circuit board) for the switches/instruments and the electronic control substrates on the cluster rear surface is advantageous in that control circuit units are gathered on the cluster rear surface, it involves the following disadvantages: It is technically difficult to adapt to the irregularities on the rear surface. Further, for each type and grade of a vehicle and for each partial change in the specification, the design and production must be changed, resulting in an increase in cost due to multikind and small-quantity production.

SUMMARY OF THE INVENTION

This invention has been accomplished to overcome the above drawbacks and its object is to provide a meter module easily adapted to a change in type and grade of a vehicle and to an addition of electric equipment and remarkably simplifying the wires around the dashboard to facilitate wiring and installation.

In order to attain the object, according to an aspect of this invention, there is provided a meter module which comprises: an instrument panel implemented with meters/indicating lamps and a drive circuit therefor; a centralized control circuit board provided with a control circuit for vehicle-mounted electric equipment including the meters/indicating lamps; and an electric junction box distributing power sources and input/output signals for the vehicle-mounted electric equipment and integrating ground wires, the instrument panel, the centralized control circuit board and the electric junction box being gathered and integrally united.

According to another aspect of this invention, there is provided a meter module which comprises: an instrument panel implemented with meters/indicating lamps and a drive circuit therefor; an electric junction box with a functional circuit incorporated therein for distributing power sources and input/output signals for vehicle-mounted electric equipment including the meters/indicating lamps and for controlling the vehicle-mounted electric equipment, and a switch unit with switches for the vehicle-mounted electric equipment incorporated therein, the instrument panel, the electric junction box and the switch unit being gathered and integrally united.

The meter module of claim 1 is constituted by separately forming the instrument panel, the centralized control circuit board and the electric junction box and gathering and integrally uniting them, and hence it may be readily assembled by providing means for connecting them with one another, e.g., known female and male connectors. Further, by adopting a multiple transmission circuit for signal lines connecting the centralized control circuit board with the instrument panel and with the electric junction box, the meter module may be easily adapted to an addition of electric equipment and its control circuit unit.

The meter module of claim 2 is formed as a cluster which only requires to be fittingly fixed in the dashboard to be installed. As a result, the troublesome wiring of wires (wiring harnesses) is made unnecessary.

The meter module, as recited in claim 3, may adopt, in addition to the connecting means between it and the dashboard wiring harness, a sub-wiring harness comprised mainly of a power line. Owing to this, the branch circuits conventionally incorporated in the electric junction box may be reduced in number, simplifying the structure of the junction box. Further, since the power line is located outside, the adverse effects on control circuits and the like resulting from a temperature rise by current flow may be reduced.

The meter module of claim 4 includes an electric junction box incorporating therein a functional circuit into which the centralized control circuit board and electric junction box in claim 1 are united and reducing as many so-called power lines of busbars as possible to realize low current. As a result, the meter module is made light and compact, while the rear frame and sub-wiring harness as mentioned above are put in disuse. The installation to the dashboard and wiring of wiring harnesses in the dashboard are facilitated.

Further objects and advantages of this invention will be apparent from the following description of the preferred embodiments of the invention as illustrated in the accompanying drawings.

BRIEF DESCRIPTION OF THE DRAWINGS

FIG. 7 is an exploded sectional view of a wiring harness protector of FIG. 6;

FIG. 20 is an exploded side view of the meter module 3" of FIG. 12;

FIG. 21A and FIG. 21B are front and side views of a switch unit 65, respectively;

FIG. 24 is a block wiring diagram of the meter module 3";

DETAILED DESCRIPTION OF THE PREFERRED EMBODIMENTS

Figure 1:
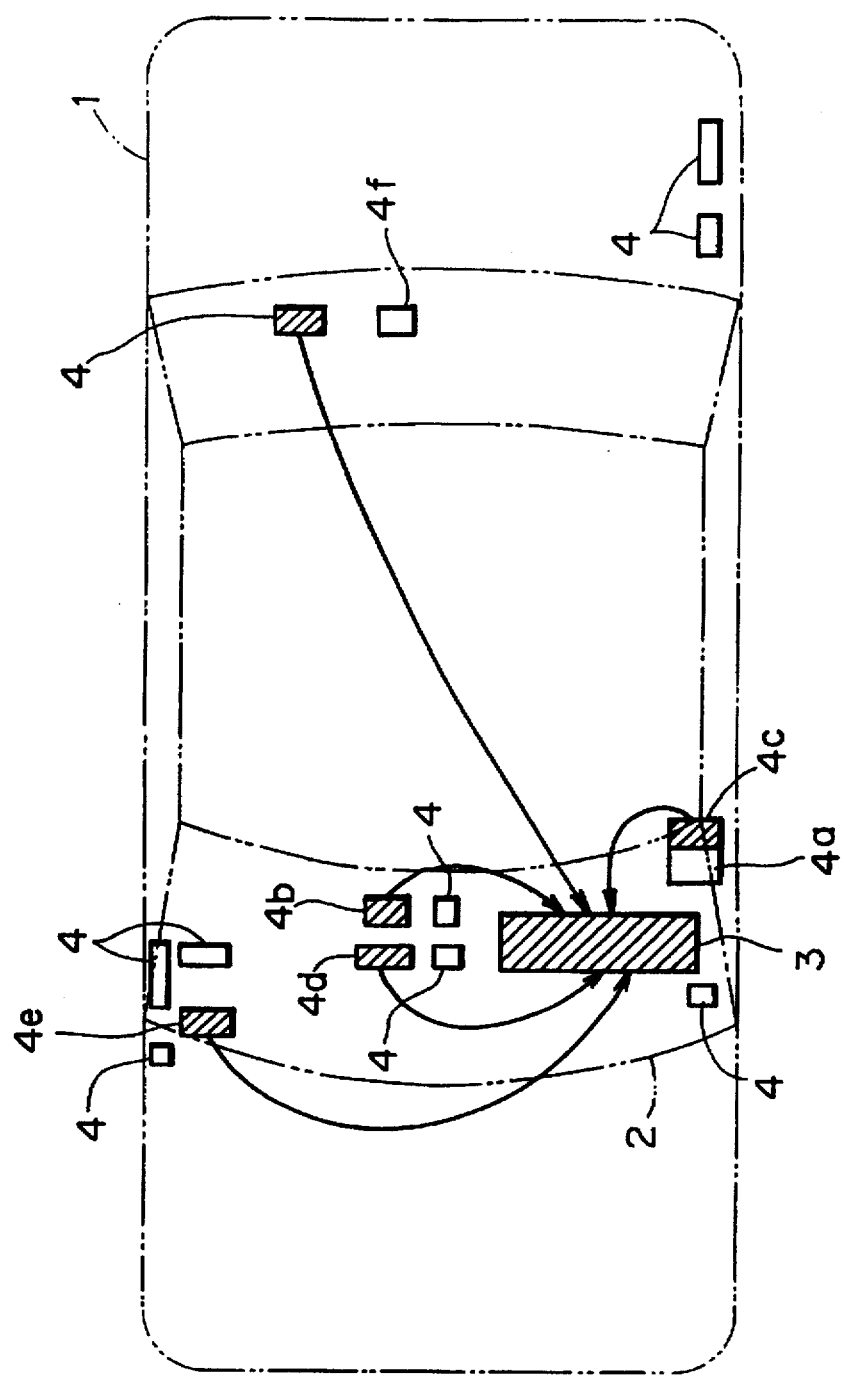
FIG. 1 is a view explaining a general idea of the construction and function of a meter module according to this invention.

FIG. 1 is a view showing a general idea of the construction and function of the meter module according to this invention. Inside a dashboard 2 of a vehicle body 1, a meter module 3 is arranged and in its vicinity a main electric junction box 4a, a sub-electric junction box 4b and an integrated module 4c are arranged together with relays, unit controls and modules such as a starter interrupt relay, electronic flasher, auto lamp relay, indicator lamp module, speed control module, blower motor relay, antena module, air bag, auto ride control, intrusion prevention control unit and remote control.

Of these circuit control units 4, the sub-electric junction box 4b, the integrated module 4c, the indicator lamp module 4d, the speed control module 4e and the auto ride control 4f, for example, which are shown by oblique lines in the figure, are gathered and integrally provided in the meter module 3 according to this invention. Consequently, the number of units and wires disposed inside the dashboard 2 greatly decreases, thereby providing a vacant space for installing other electric equipment.

Figure 2:
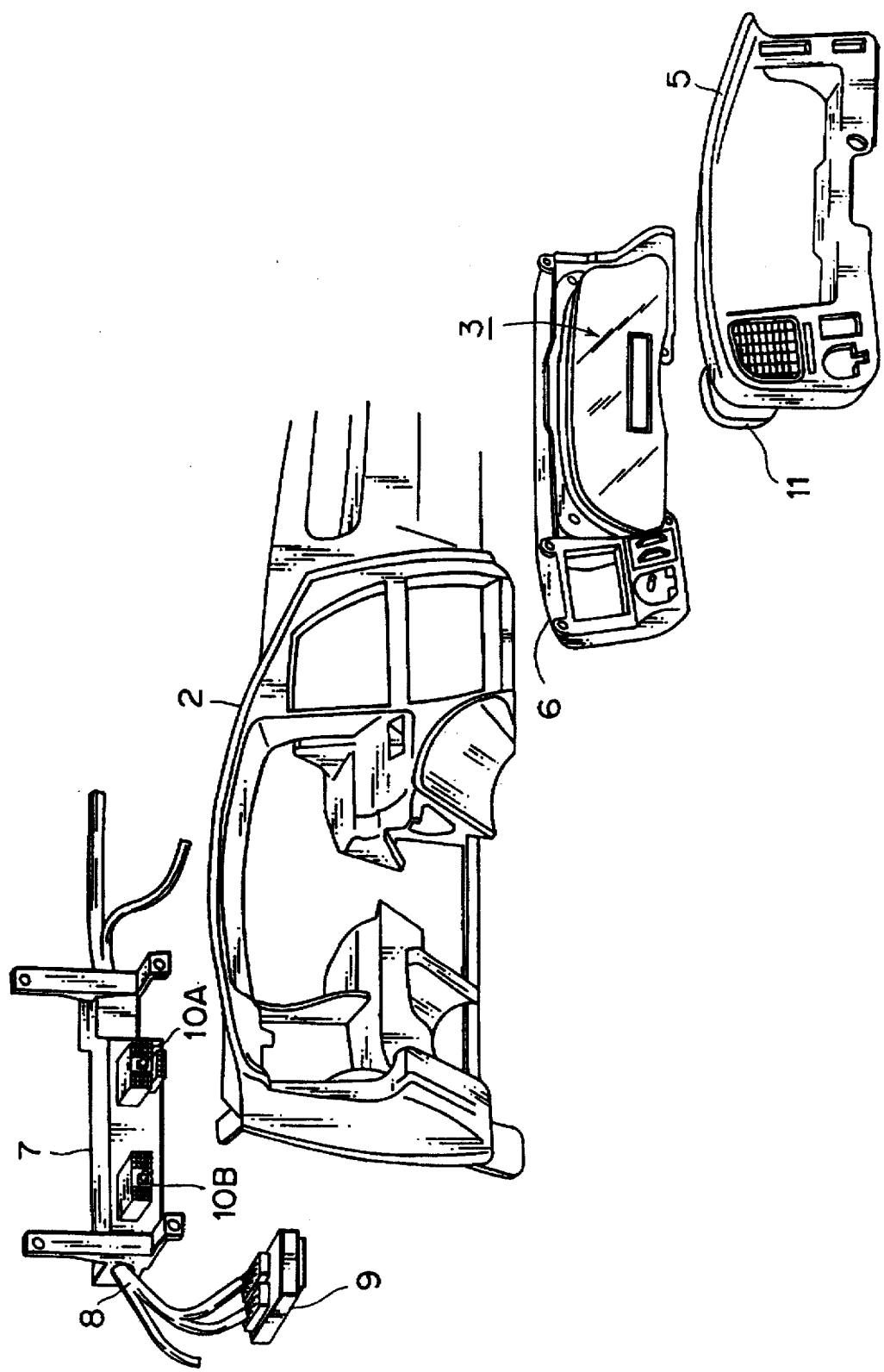
FIG. 2 is a perspective view of the meter module of this invention and a dashboard portion, shown separated.

FIG. 2 is a perspective view showing the meter module 3 of this invention and the dashboard 2, separated from each other. The meter module 3 is accommodated between a finish panel 5 and a rear frame 6 to be fixed in the dashboard 2 as a cluster. Designated 7 is a protector for a dashboard wiring harness 8 (hereinafter abbreviated as "dashboard harness"), which protector is integrally formed with multi-pole connectors 10A and 10B adapted to be directly bolted to the meter module 3. Designated 9 is a main electric junction box of a known construction carrying a number of fuses, relays and the like and corresponding to the main electric junction box 4a in FIG. 1. 11 is a defroster mounted to the finish panel 5.

Figure 3:
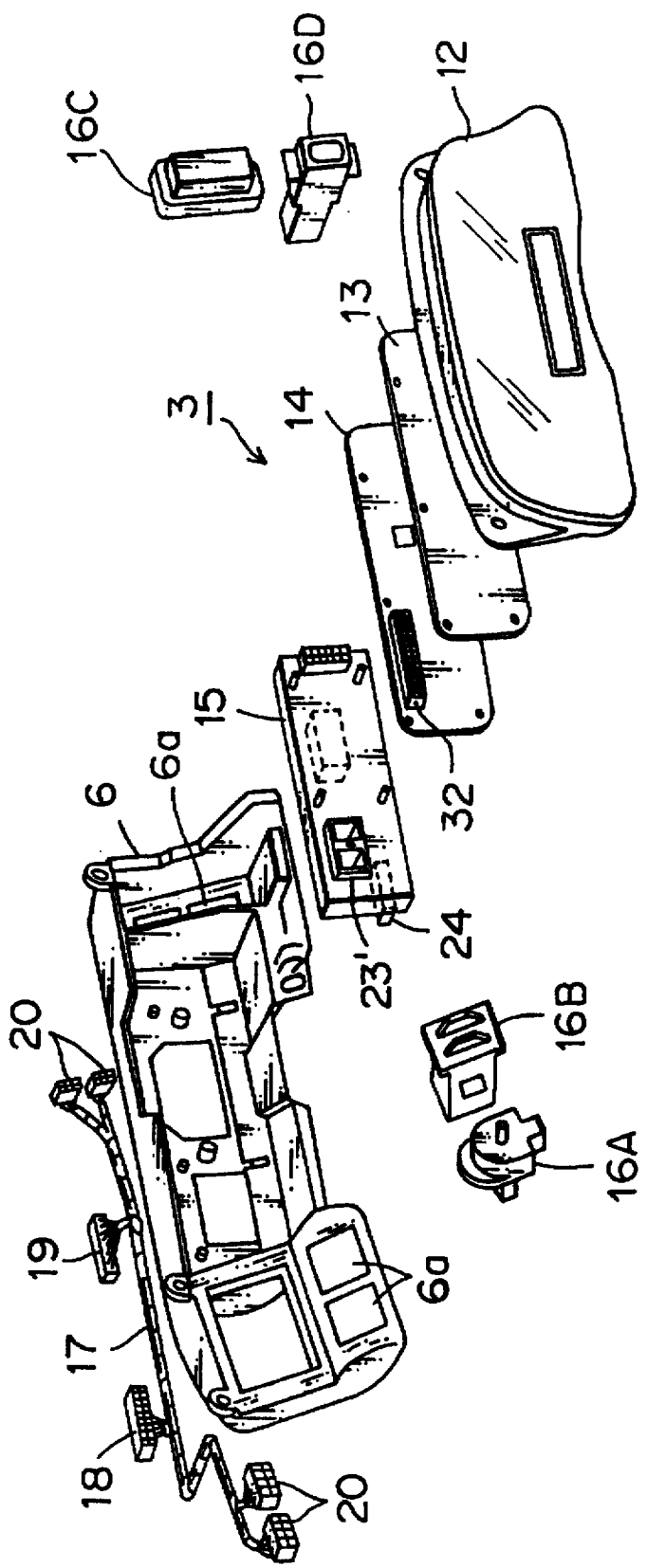
FIG. 3 is an exploded perspective view of the meter module.

The meter module 3 is made up of an instrument panel 12, a drive circuit board 13 therefor, a centralized control circuit board 14, an electric junction box 15 and the like as shown in FIG. 3.

Designated 16A–16D are switches for various loads such as a head lamp, which switches are fixed in mounting openings 6a in the rear frame 6. A sub-wiring harness 17, different from the above-mentioned dashboard harness 8, has at its intermediate portions a with-module-connected connector 18 and a with-dash-board harness-connected connector 19, and at each end connectors 20 directly mounted to instruments.

Figure 4:
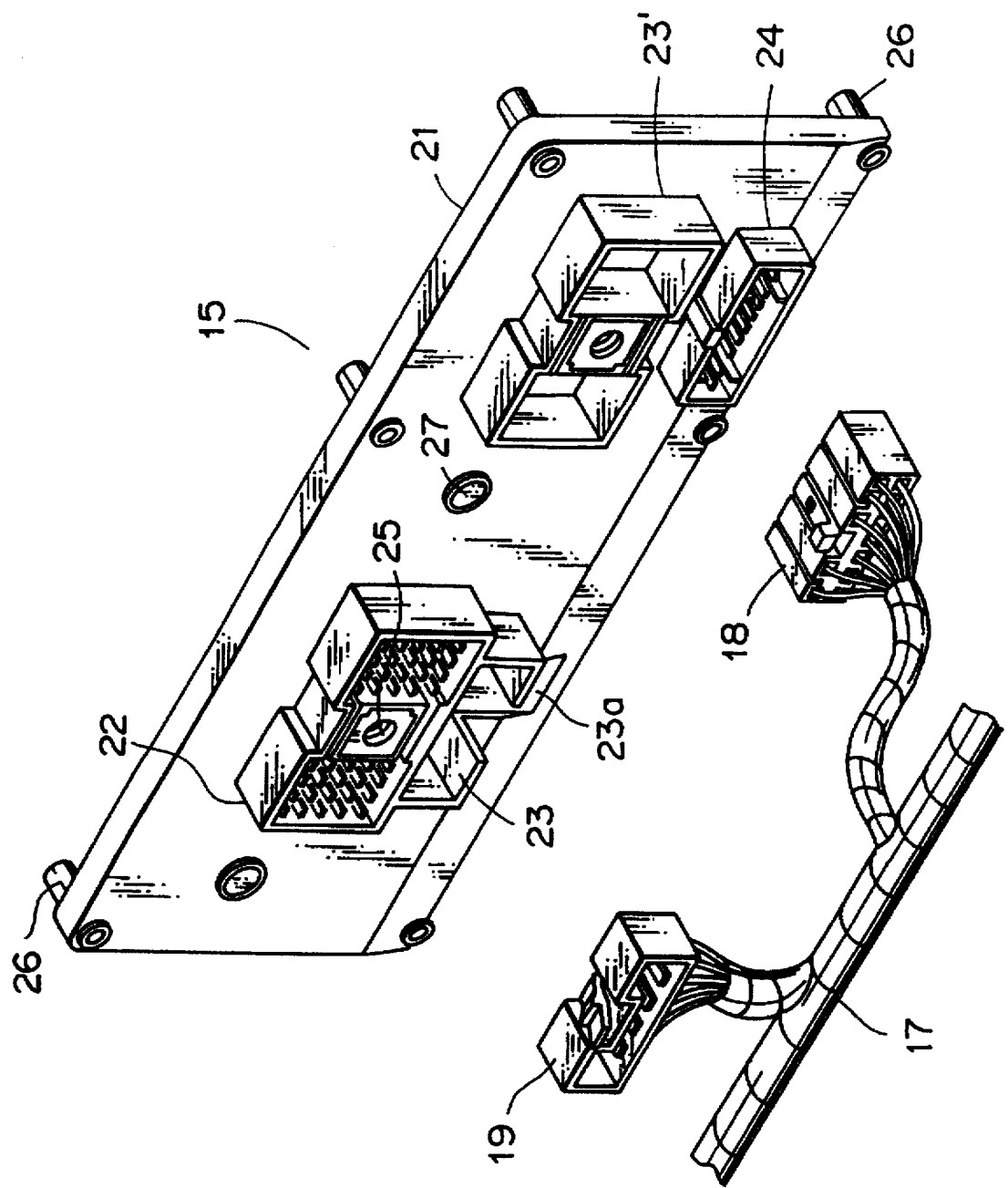
FIG. 4 is a perspective view of a meter module-constituting electric junction box and a module sub-wiring harness.
Figure 5:
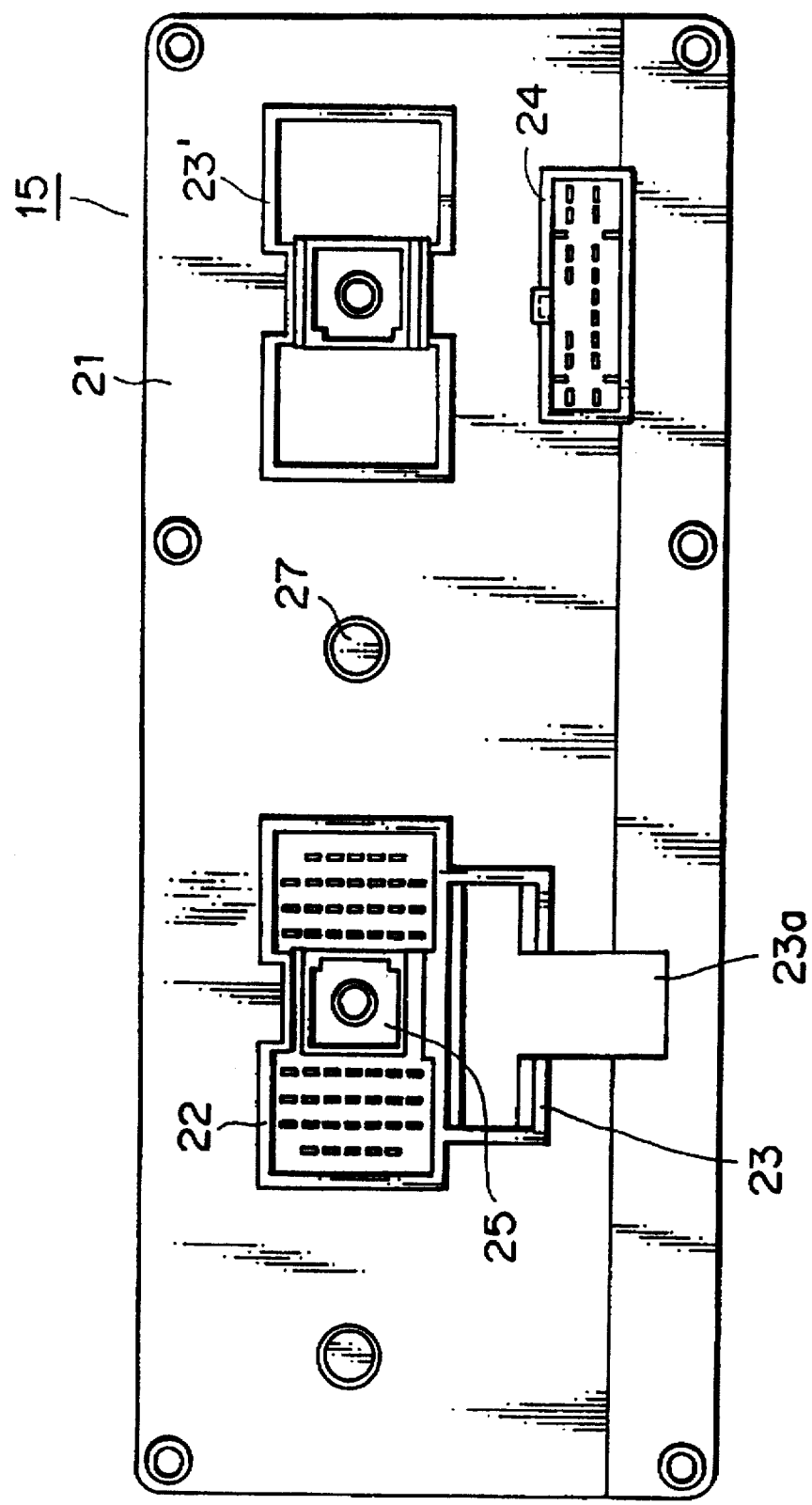
FIG. 5 is a rear view of the electric junction box of FIG. 4.

FIG. 4 is a perspective view showing the electric junction box 15 and the sub-wiring harness 17 in relation to each other, and FIG. 5 is a rear view of the electric junction box 15.

The electric junction box 15 is of a conventional construction in that busbar circuit boards 34 (see FIG. 6) are arranged in a stack in an insulating case 21, the busbar circuit boards each consisting of an insulating substrate 34b and a plurality of busbars 34a supported thereon. In this invention, however, a connector 22 for connection to the dashboard harness 8 and a connector-fitting opening 23 are provided the former above the latter, on one side of the rear surface of the insulating case 21, and a connector-fitting opening 23' and a connector 24 for the sub-wiring harness, the former above the latter, on the other side. The with-dash-board harness-connected connector 19 of the sub-wiring harness 17 is fitted, facing rearwardly, in the connector-fitting opening 23 with a harness insertion hole 23a, and a with-dash-board harness-connected connector 33 on the centralized control circuit board 14 (see FIG. 6) is fitted in the connector-fitting opening 23'. A nut 25 is provided in a central portion of each of the connector 22 and the connector-fitting opneing 23' for cooperation with bolts 41 (see FIG. 6) of the multipole connectors 10A and 10B. Spacers 26 and a positioning pin 27 are used when the insulating case 21 is assembled with the instrument panel 12, the drive circuit board 13 and the centralized control circuit board 14.

Figure 6:
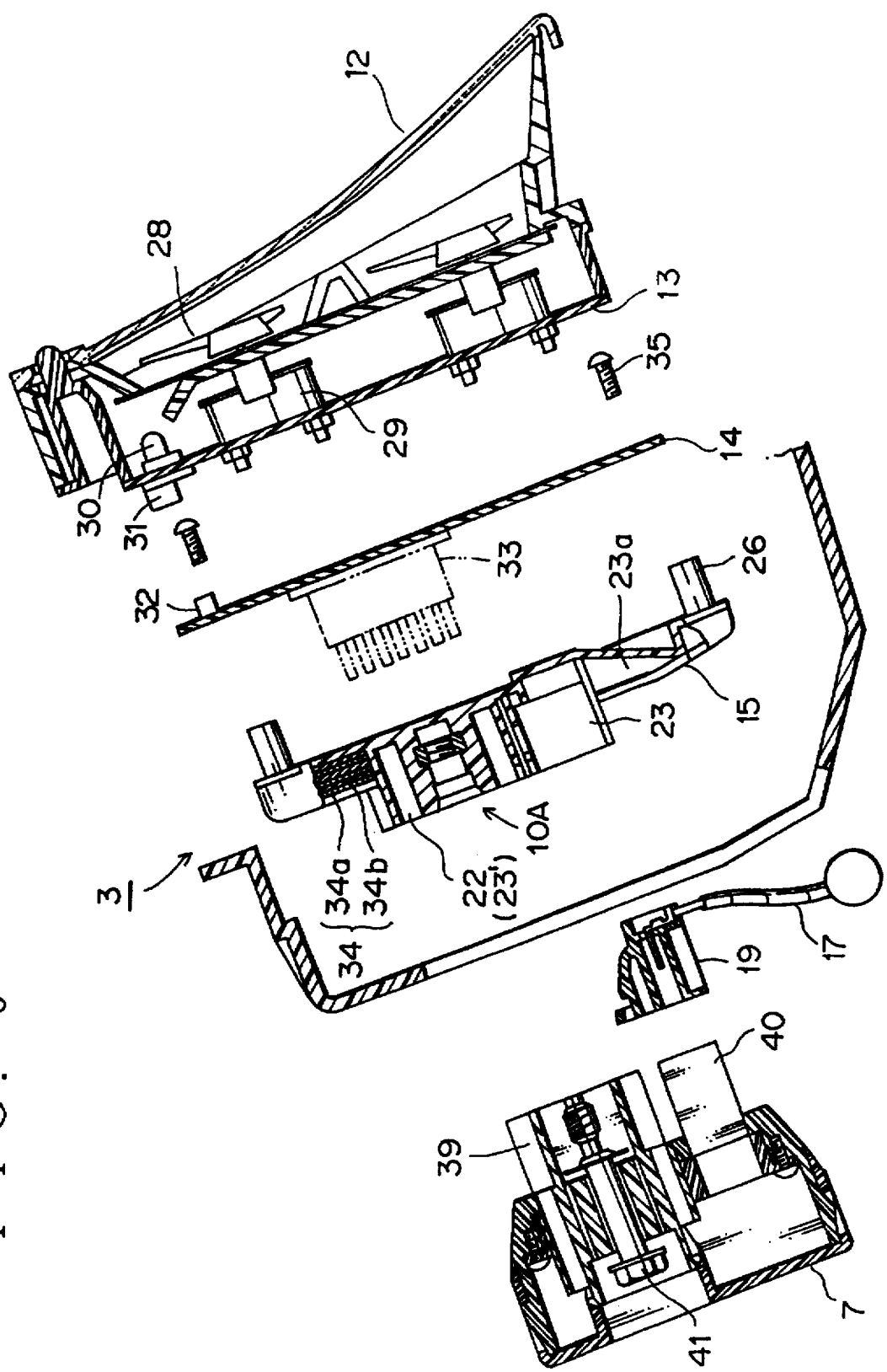
FIG. 6 is an exploded sectional view of the meter module.
Figure 8:
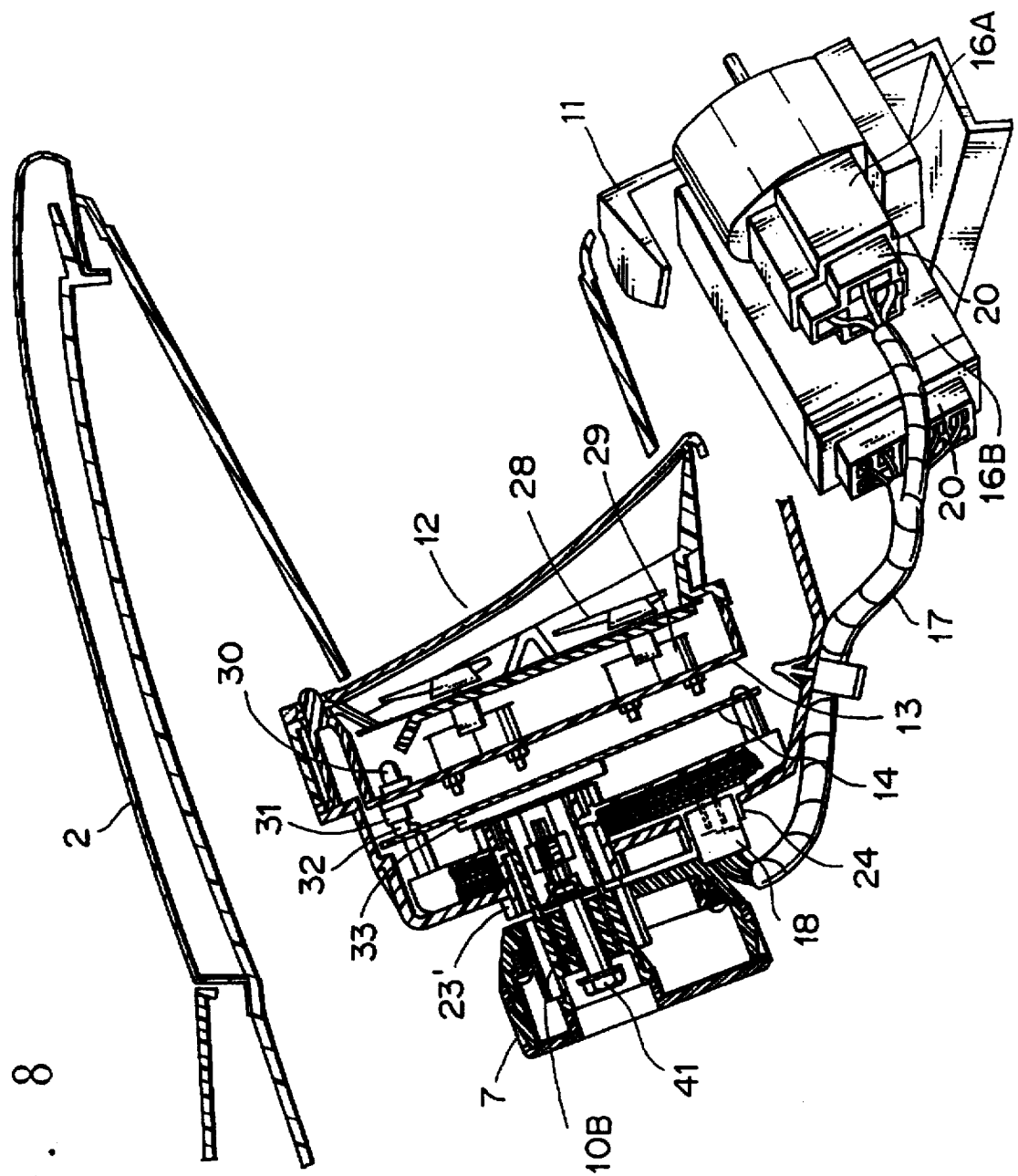
FIG. 8 is a sectional view showing the meter module assembled and installed in the dashboard portion.

FIG. 6 is an exploded, sectional view of the meter module 3, FIG. 7 is an exploded, sectional view of the wiring harness protector 7, and FIG. 8 is a sectional view showing the meter module 3 assembled and installed in the dashboard 2.

In these figures, meters/indicating lamps (meters 28 in the example illustrated) are implemented at the front of the instrument panel 12 and on the back side the drive circuit board 13 with a movement 29 for the meter 28 fixed thereon is attached. On the front and back sides of the drivie circuit board 13 are respectively provided a lighting bulb 30 and a connector 31 for connection to the centralized control circuit board 14. The drive circuit board 13 is provided, as shown in FIG. 9, with drive circuits 50A–50D for meters 51 such as a speed meter 51A and tachometer 51B, lamps 52, an odo/trip meter 53 and the like implemented in the instrument panel 12.

The centralized control circuit board 14 is provided, on one surface, with a connector 32 fitted to the connector 31 for connection with the drive circuit board 13 and, on the other surface, with the with-dash-board harness-connected connector 33.

Figure 9:
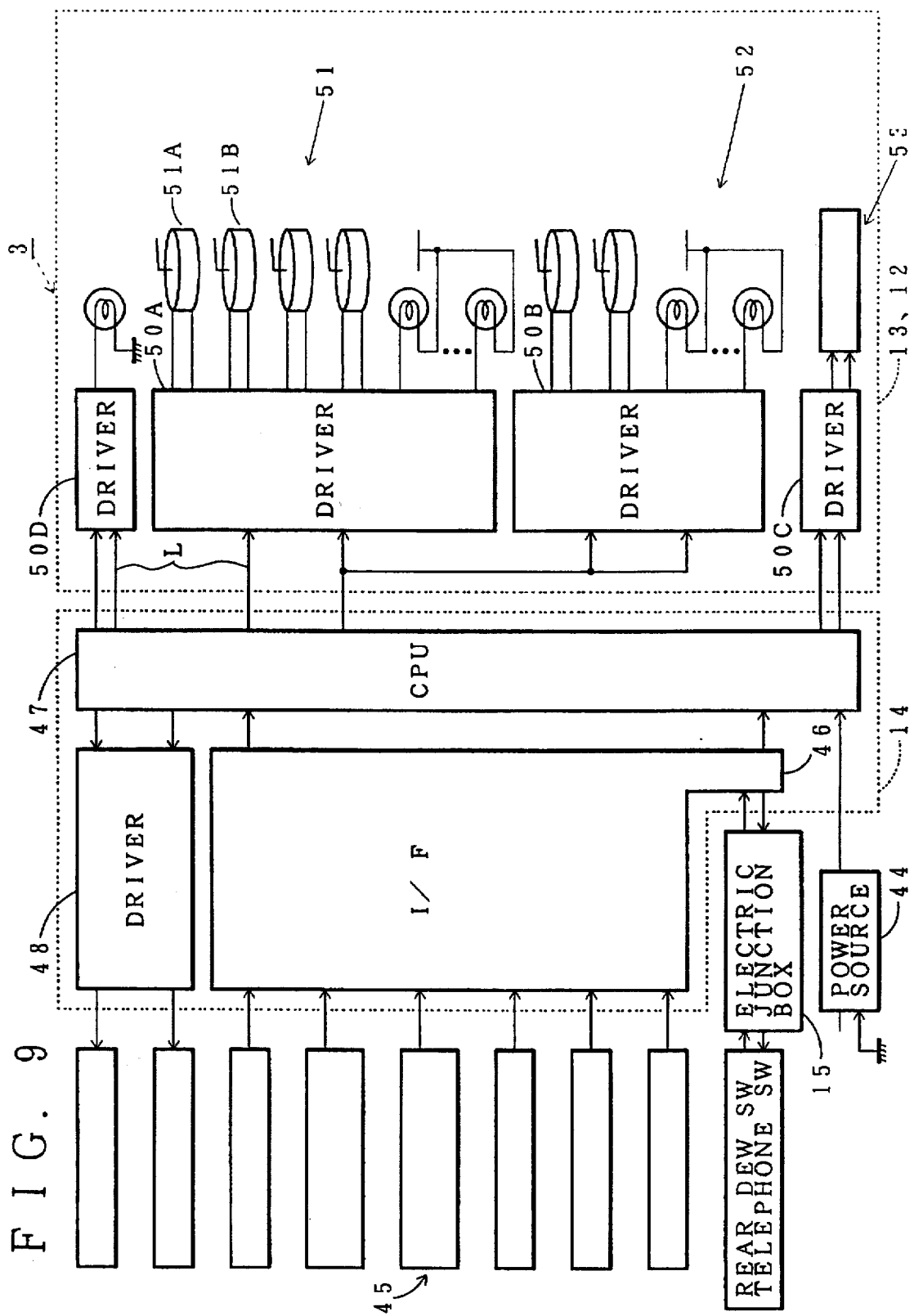
FIG. 9 is a block wiring diagram of the meter module.

As shown in FIG. 9, the centralized control circuit board 14 is made up of an I/F circuit 46, a micro computer (CPU) 47 that effects memory, operation processing and the like necessary for electronic control of electric equipment such as the meters/indicating lamps 28 in the instrument panel 12 (not limited to those installed in the dashboard 2), and other drive circuit 48, all incorporated in an ordinary hard printed circuit board (HPC).

For versatile use irrespective of the type and grade of a vehicle, a circuit board is employed as this centralized control circuit board 14, which is, in addition to the above-mentioned functions of memory and operation, provided with various functions such as digitizing function of meters, timer function such as key reminder, light reminder and wiper control, and multidisplaying function such as time/odotrip. Further, it is preferred to use a circuit board provided in advance with optional functions such as navigation, multifunction switch, intrusion prevention control and key-less entry. The circuit board 14 may be replaced by such an optional function-provided circuit board.

The wiring harness protector 7 consists of a protector body 36 and its cover 37 formed respectively with a locking hole 36a and a locking claw 37a.

Designated 38 is a connector stop. Designated 39 and 40 are split connectors constituting the multipole connector 10A. After the split connectors 39 and 40 are inserted into openings 37b in the cover 37, the connector stop 38 is fitted thereover, followed by fixing to the cover 37 with screws 42. A bolt 41 extends through the split connector 39, in the direction of the fitting axis of the latter, and a bolt-screwing opening 36b is formed at a position of the protector body 36 corresponding to the bolt 41.

In assembling the wiring harness protector 7, the split connectors 39 and 40 are in advance attached to reqired cable terminals of the dashboard harness 8 (see FIG. 2). The dashboard harness 8 is then partially accommodated in the protector body 36, while fixing the connectors 39 and 40 in the cover 37 with the connector stop 38 as described above. The cover 37 is then fitted in the protector body 36 such that the hole 36a and the claw 37a are engaged with each other to lock the cover and the protector body together. Thus, the protector 7 is easily assembled.

In the above construction, the meter module 3 is assembled as follows. As shown in FIG. 6, the centralized control circuit board 14 is placed on the spacers 26 having threaded holes (not shown), with the with-dash-board harness connected connector 33 inserted into the connector-fitting opening 23' of the electric junction box 15, followed by fixing with screws 35. Thereafter, the connector 31 and the connector 32 are coupled to connect the drive circuit board 13 of the instrument panel 12 with the centralized control circuit board 14. Thus, the assembly is easily attained.

The thus assembled meter module 3 is accommodated between the finish panel 5 and the rear frame 6 as described hereinabove, which are then fixed to each other by screws the like to form a cluster suitable for direct installation and fixation in the dashboard 2.

The connection of the meter module 3 or the above cluster with the dashboard harness 8 and with the sub-wiring harness 17 is also easily attained as follows.

The with-module-connected connector 18 of the sub-wiring harness 17 is coupled to the connector 24 at the rear surface of the meter module 3, while the with-dashboard harness-connected connector 19 is fitted, facing rearwardly into the connector-fitting opening 23. The instrument-directly mounted connectors 20 at each end of the sub-wiring harness 17 are, as shown in FIG. 8, coupled to the switches 16A, 16B as of a head lamp on the rear frame 6.

Lastly, the multipole connectors 10A and 10B on the protector 7 ape respectively pushed in the connector 22 and the connector-fitting opening 23' on the rear surface of the meter module 3, so that the split connectors 39 and 40 of the multipole connector 10A are respectively connected to the connector 22 and the connector 19, and the multipole connector 10B to the connector 33 in the connector-fitting opening 23'. The necessary electric connection between the dashboard harness 8, the sub-wiring harness 17 and the meter module 3 (the centralized control circuit board 14, the electric junction box 15) is thus attained.

FIG. 9 is a block wiring diagram with the meter module 3 of this invention employed.

In the figure, designated 44 is a power source and 45 are signal-generating means such as a control module, actuator, switch, sensor and the like. +B power source, ACC power source and IGN power source supplied to the meter module 3 are supplied to the centralized control circuit board 14 and the instrument panel 12 via the electric junction box 15 in the module. The information (signals) necessary for controlling the functions such as the light reminder (alarm against leaving without lights out) and keyless entry are supplied from the above signal-generating means 45 to the CPU 47 via the I/F circuit 46 in the meter module 3 and other I/F circuits (not shown). The CPU 47 effects processing (operation) needed according to the signal input and gives output signals as for buzzing and door lock via the various drive circuits 50A–50D and drive circuit 48.

The CPU 47 effects, in addition to the operation and control of the above functions, the drive control of the movement 29 provided in the instrument panel 12 and the on-and-off control of the various indicators 52. The movements 29 of the speedmeter 51A, tachometer 51B and the like are mainly Of a cross coil type and are dynamically driven (time-division drive) by a single drive circuit 50A. The CPU 47 takes in the sensor signals necessary for driving the above movements via input/output I/F 46, operates the measured value for each movement, and serially transmits its result to the drive circuit 50A via a multiple signal line L.

The LCD 53 for odo, trip and time indication is controlled by the odo, trip and time operation drive circuit 50C which receives a speed signal from the I/F circuit 46 and effects the operation of an integrated distance and clock counting.

Figure 35:
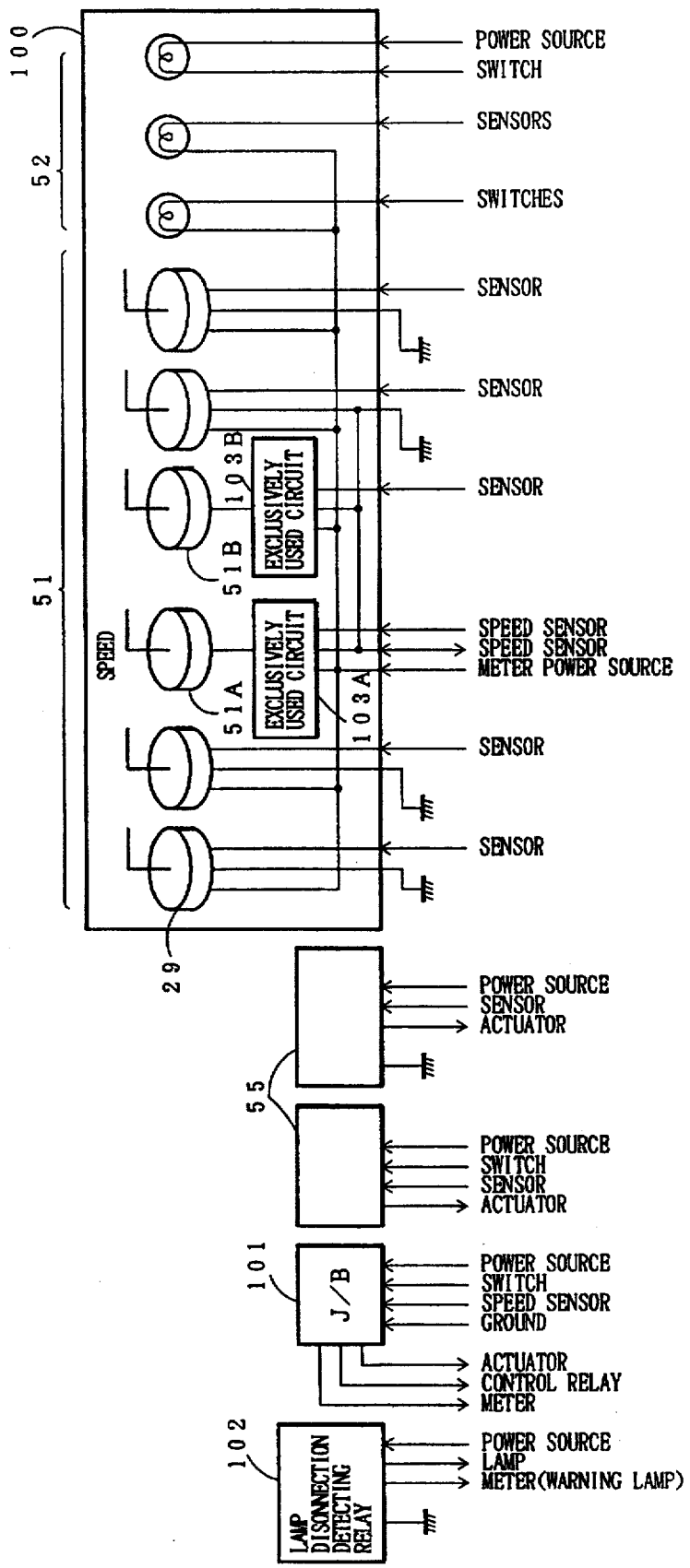
FIG. 35 is a block wiring diagram of a conventional combination, relay and electric junction box.
Figure 36:
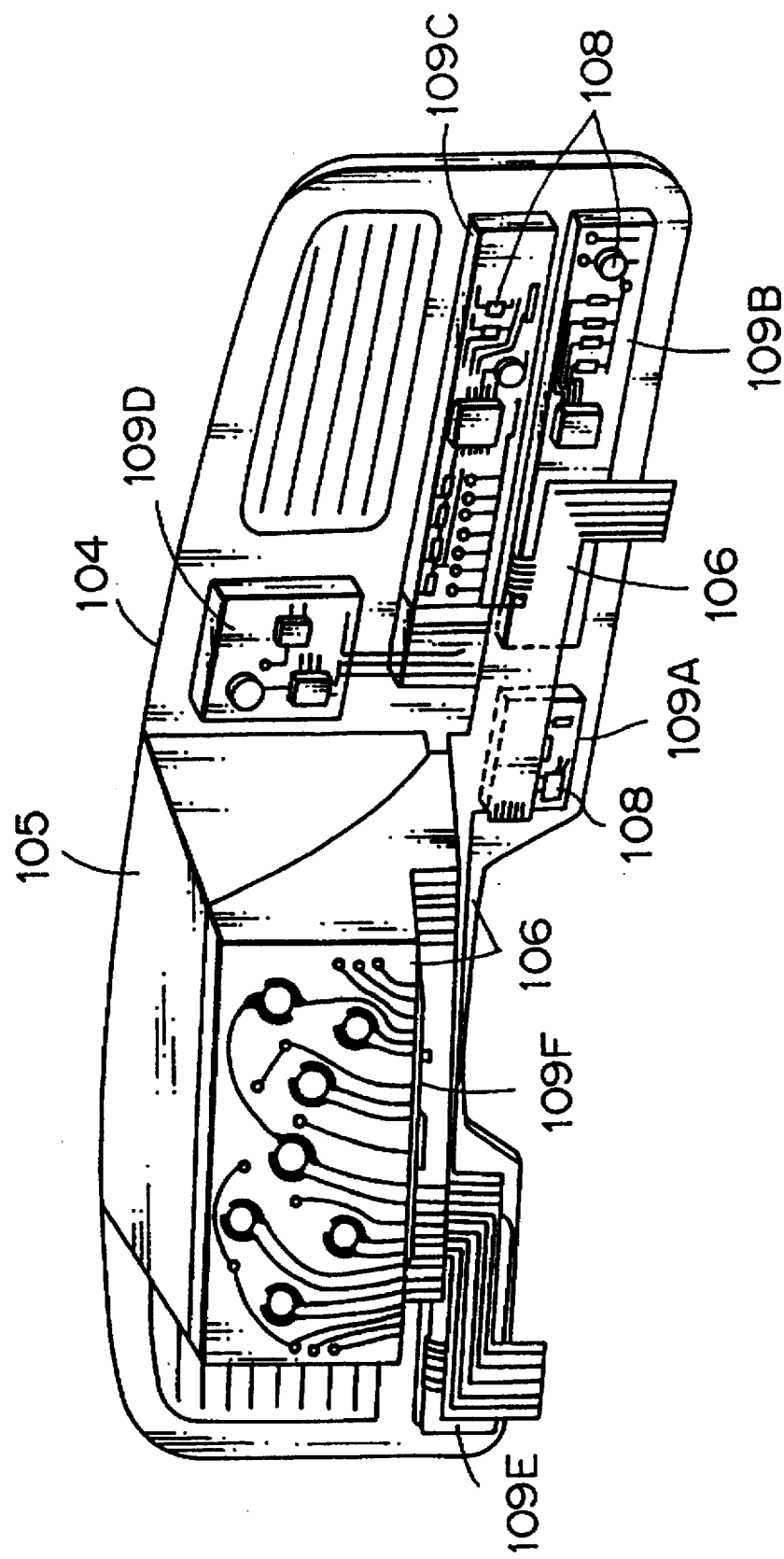
FIG. 36 is a view showing a conventional electric circuit structure at the dashboard portion.

When this FIG. 9 and the prior art-showing FIG. 35 are compared, it is apparent that the number of circuits (the number of wires) around the dashboard is greatly reduced, since, for example, the control circuits 103A, 103B (or control circuit units) for exclusive use by the speedmeter 51A and tachometer 51B are incorporated into the meter module 3 according to this invention, and the number of circuits for connecting the CPU 47 and the drive circuits 50A–50D is also reduced by the adoption of the multiple transmission circuit L.

Figure 10:
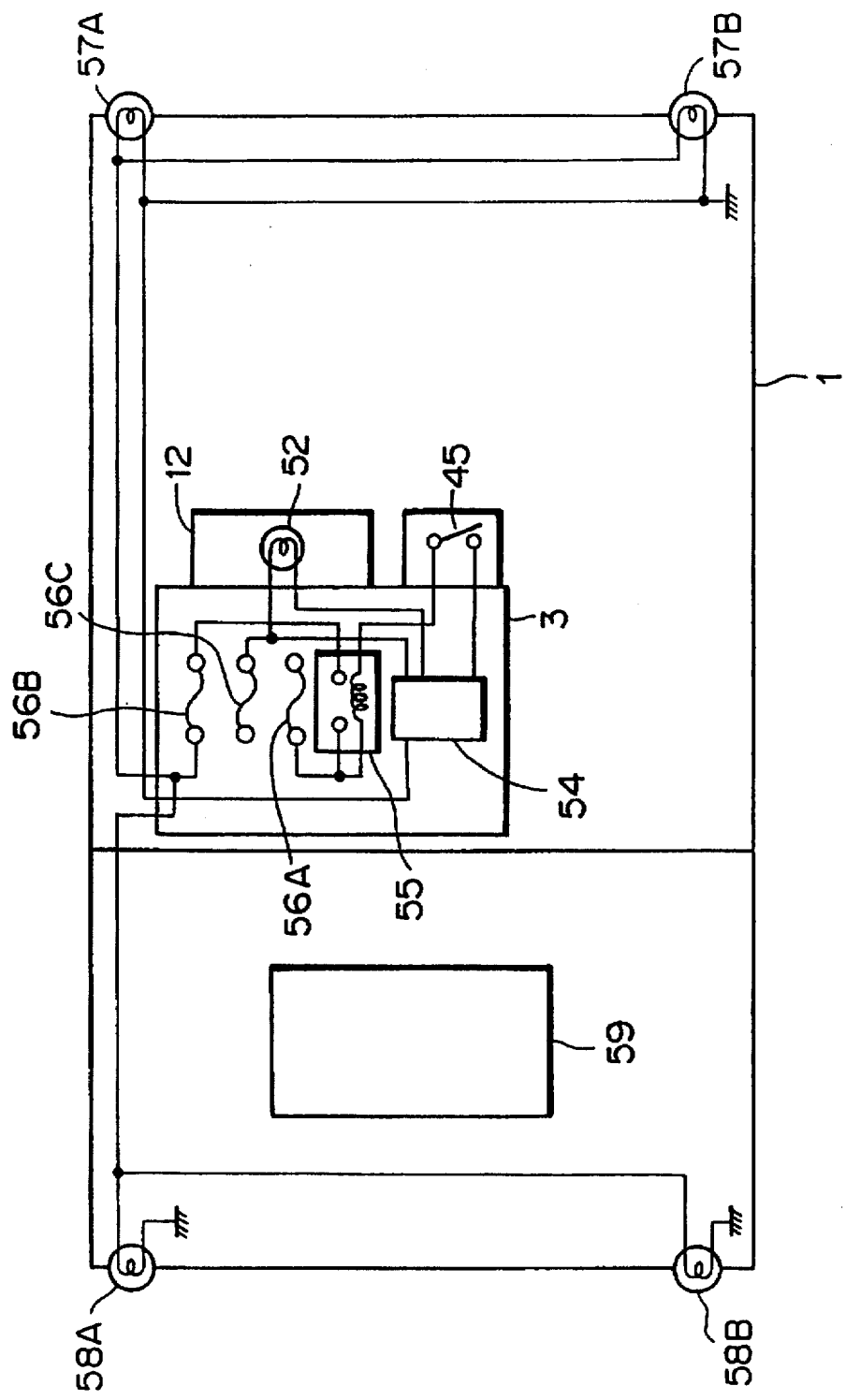
FIG. 10 is a wiring diagram showing an example of internal wiring of a vehicle with the meter module used.
Figure 34:
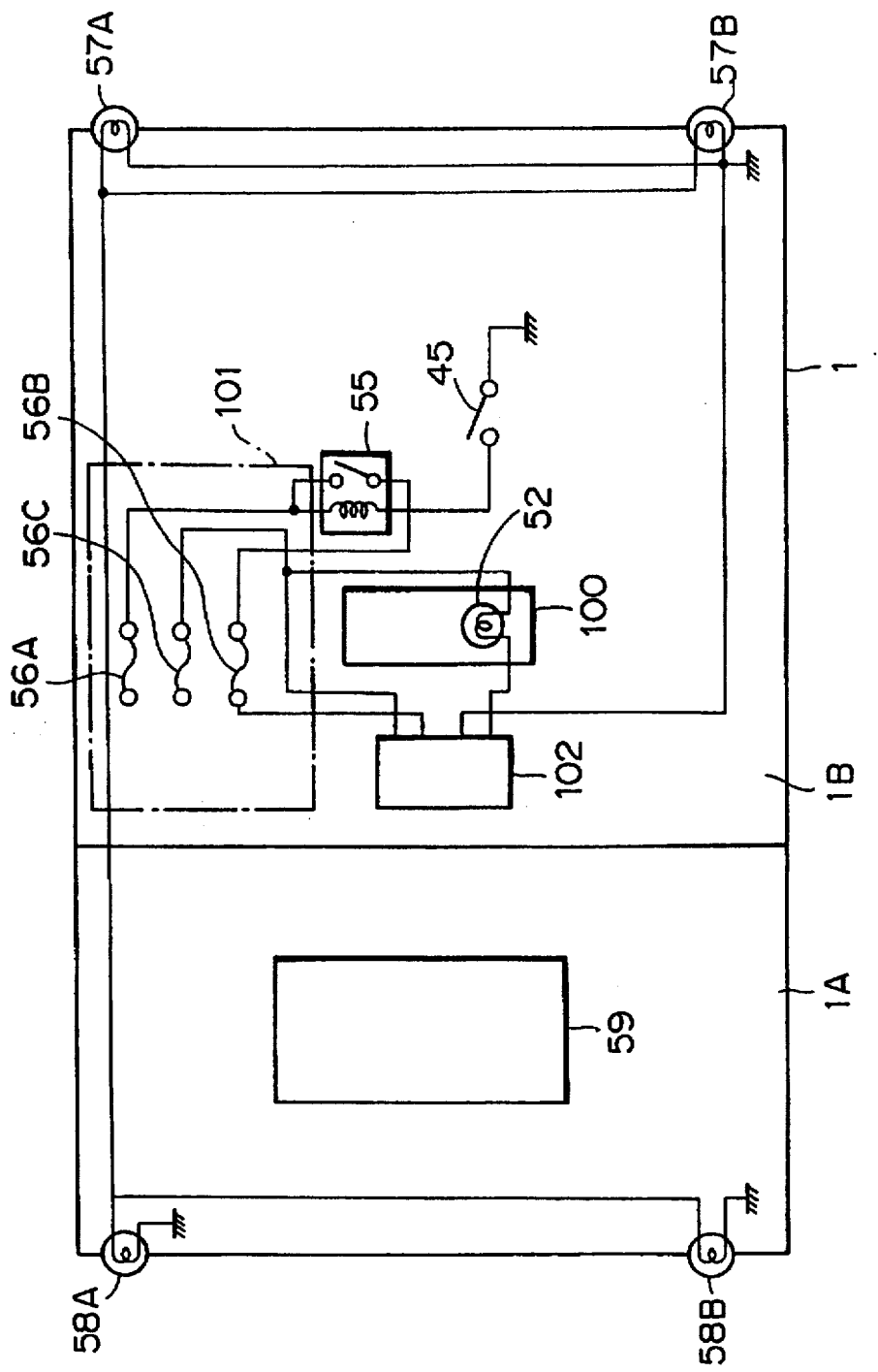
FIG. 34 is a conventional wiring diagram corresponding to FIG. 10.

FIG. 10 is a wiring diagram of a tail lamp system with the meter module 3 of this invention employed. When compared with the prior art-showing FIG. 34, it is likewise apparent that the number of wires decreases, since the tail lamp disconnection detection relay 54, tail relay 55 and fuses 56A–56C are collectively provided in the meter module 3.

Figure 11:
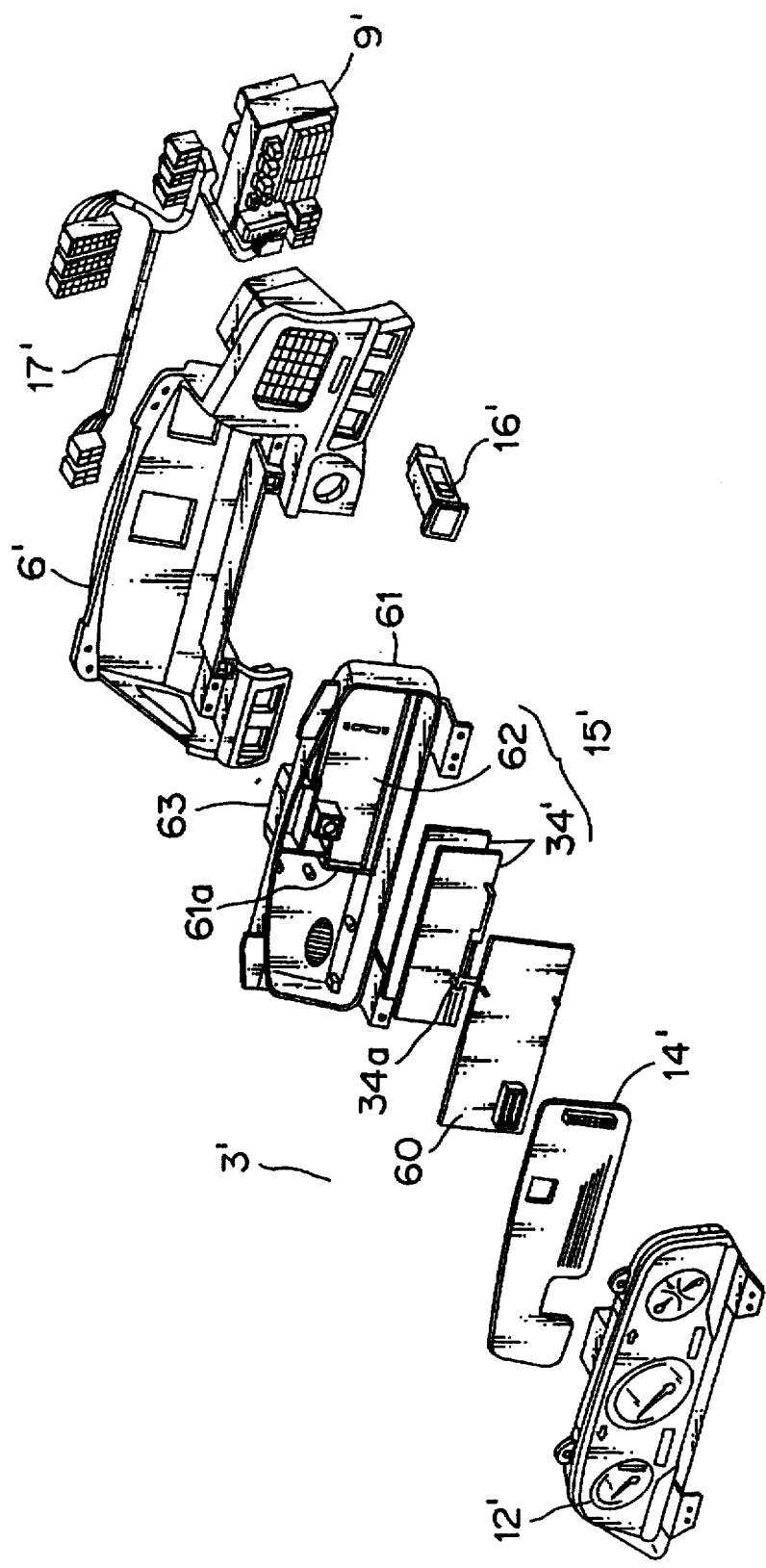
FIG. 11 is an exploded perspective view of a meter module according to another embodiment of this invention.

FIG. 11 is an exploded, perspective view showing another embodiment of the meter module according to this invention. In the figure, designated 6' is a rear frame making the pair to a finish panel (not shown), 9' a main electric junction box, 12' an instrument panel, 14' a centralized control circuit board, 16' a switch and 17' a sub-wiring harness, which are of the same constructions as in the above embodiment and their description will be omitted.

Designated 61 is a sub rear frame. The sub rear frame 61 is on its one side integrally formed with a busbar conductor-accommodating portion 62 defined by a partition 61a where a plurality of busbar conductor boards 34' are stacked and covered by a cover 60 to form an electric junction box. 15'. The sub rear frame 61 is further formed with a portion 63 where bolt-fastened connectors are gathered for direct connection with a not-shown dashboard harness, the centralized control circuit board 14' and electric junction box 15'.

With the meter module 3' shown in FIG. 11, since the electric junction box 15'—which shows a considerable temperature rise due to heat generated by current flow—is disposed aside to one side of the sub rear frame 61, thermal influences on the centralized control circuit board 14' and the drive circuit board (not shown) on the rear face of the instrument panel 12' are reduced, while the circuit members such as instrument panel 12', centralized control circuit board 14' and electric junction box 15' may be formed compact separately from the large-sized rear frame 6' with a console center, advantageously leading to easy production and handling.

While in the above embodiments, the sub-wiring harness 17, 17' is shown to be of a wire-converged type in which ordinary wires are wound with a tape, it is also possible to use a so-called flat harness formed from conductors such as ribbon wires and copper foils arranged in a row and insulatingly covered from above and below.

As further advantages, since the meter module 3, 3' may be easily removed from the dashboard 2 together with the finish panel 5, the electric equipment and instruments around the module 3, 3' may be viewed through the backside of the dashboard 2 without separating the dashboard from the vehicle body, facilitating maintenance of the near-by instruments. Where the specification for the instrument panel 12, 12' is different or partly changed according to the vehicle type and grade, since the centralized control circuit board 14 is commonly usable as described above, the instrument panel alone needs to be replaced, allowing an easy handling.

Figure 12:
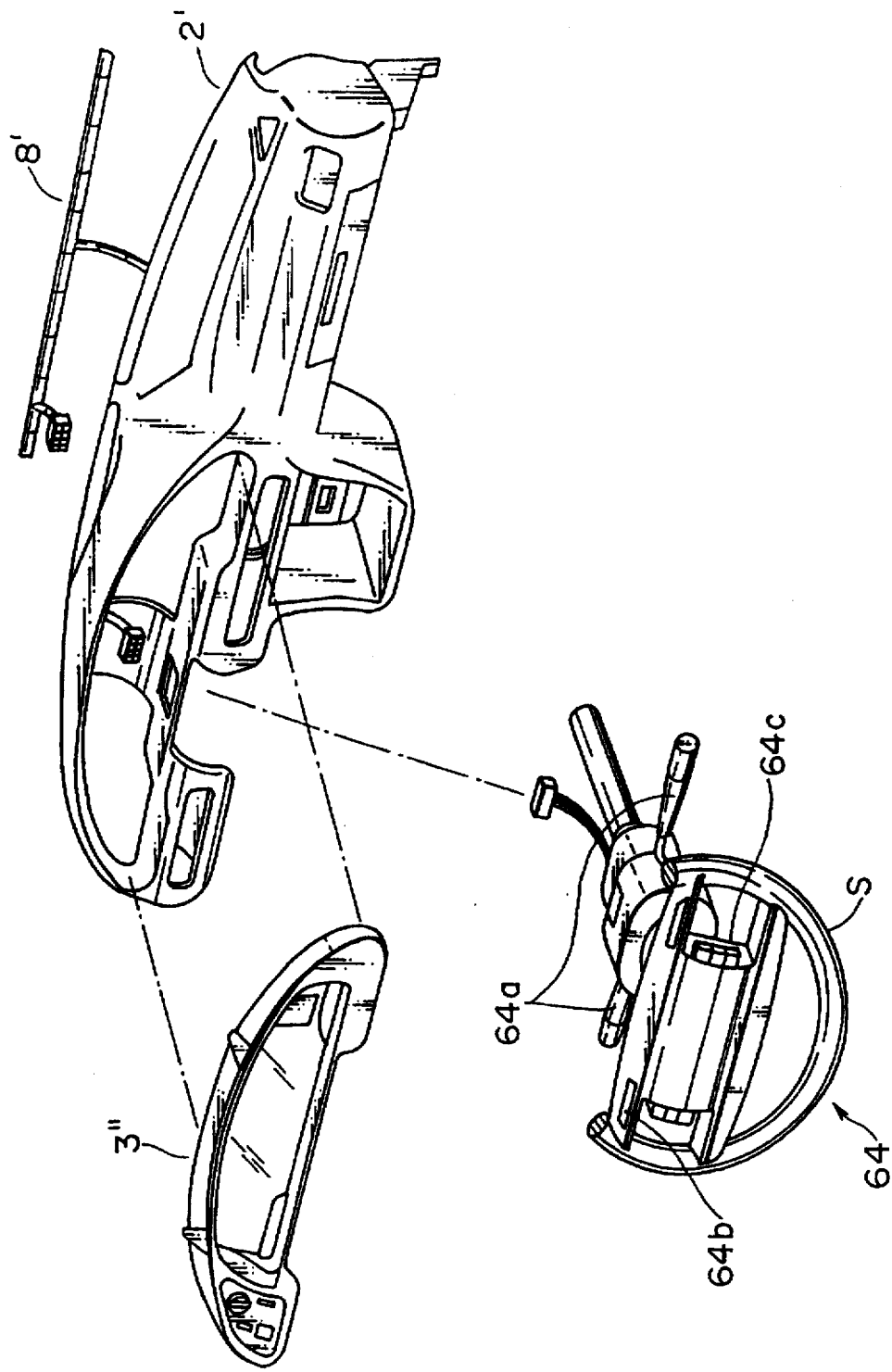
FIG. 12 is a perspective view of a meter module 3" according to another embodiment of this invention and a dash-board 2', shown separated.
Figure 13:
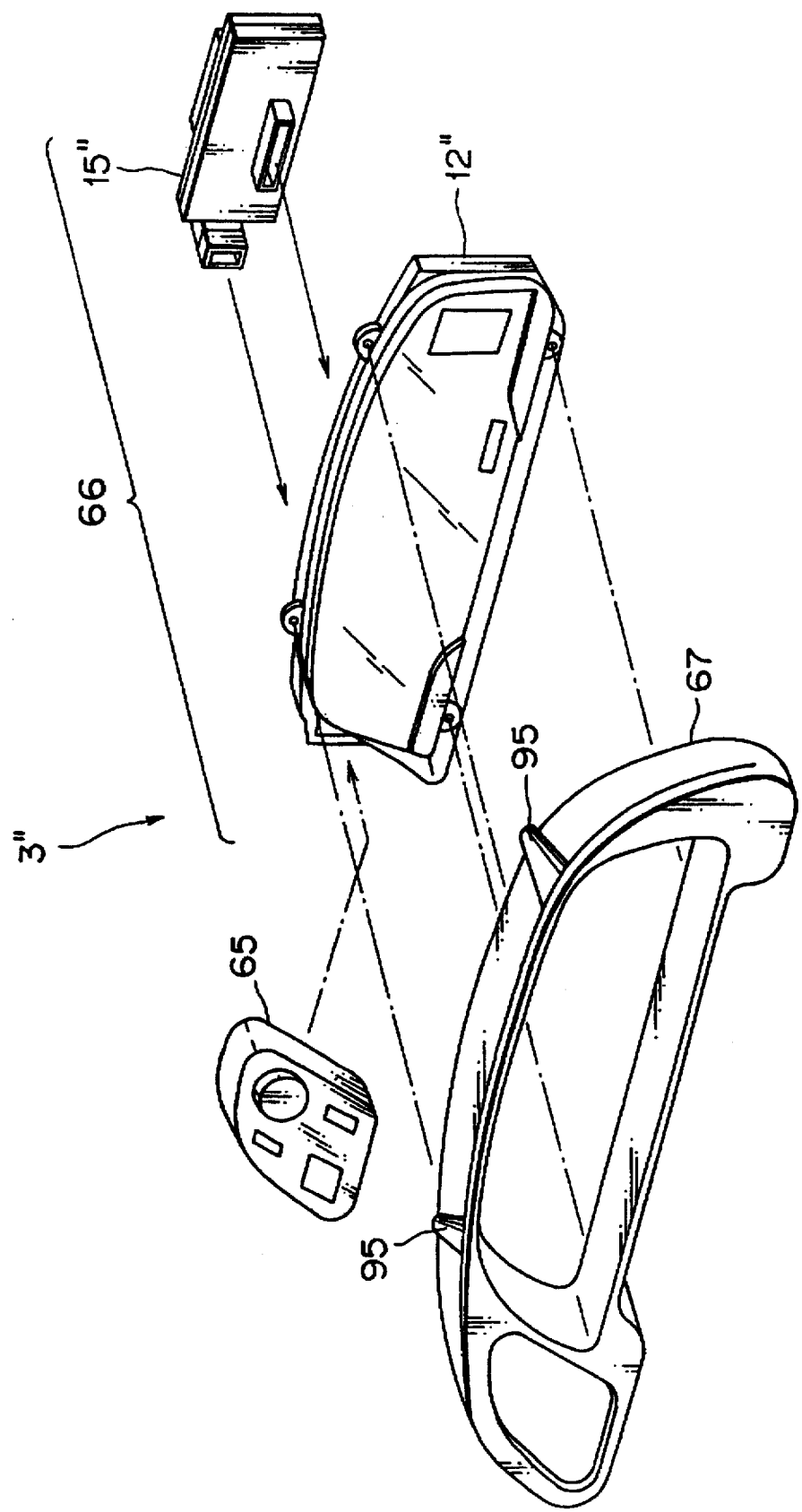
FIG. 13 is an exploded perspective view of the meter-module 3" of FIG. 12.
Figure 14:
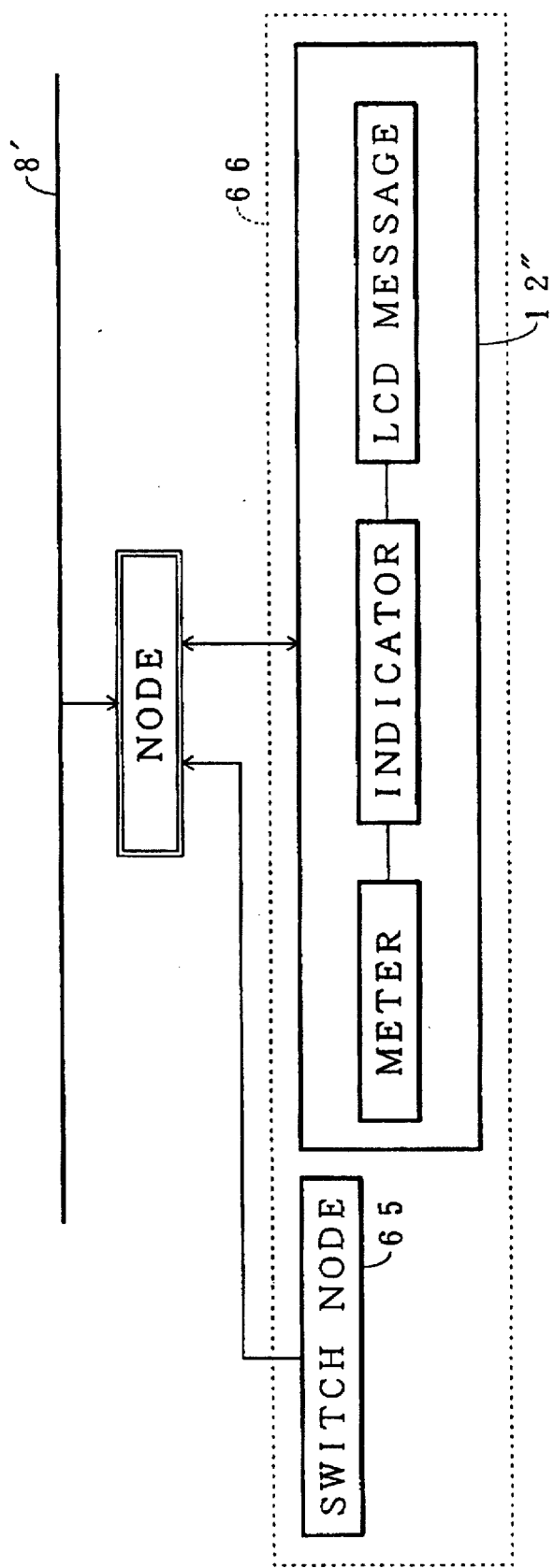
FIG. 14 is a system block diagram of the meter module 3" of FIG. 12.

FIG. 12 is a perspective view showing a meter module 3" and a dashboard 2', separated from each other, according to another embodiment of this invention. FIG. 13 is an exploded perspective view of the meter module 3" of FIG. 13. FIG. 14 is a system block diagram of the meter module 3".

Referring to these figures, the meter module 3" and a steering wheel S with a column switch assembly 64 are mounted on the dashboard 2' from the front side, and a dashboard harness 8' is mounted from the rear side. The switch assembly 64 includes, e.g., switches such as a horn switch 64b and tilt/tele switch 64c in addition to multifunction switches 64a on the left and right sides. The input/output signals and the like of these switches are electrically connected by the electric junction box 15".

The meter module 3", as shown in FIG. 13, is made up of a cluster module 66 and a finish panel 67. The cluster module 66 includes an instrument panel 12" with meters/indicating lamps and their drive circuits implemented therein; an electric junction box 15" with a function circuit incorporated therein for distributing the electric supply and input/output signals for vehicle-mounted electric equipment including the above meters/indicating lamps and for controlling the vehicle-mounted electric equipment; and a switch unit 65 with switches for the vehicle-mounted electric equipment incorporated therein. The instrument panel 12" the junction box 15" and the switch unit 65 are gathered and integrally united in the cluster module 66.

Figure 15:
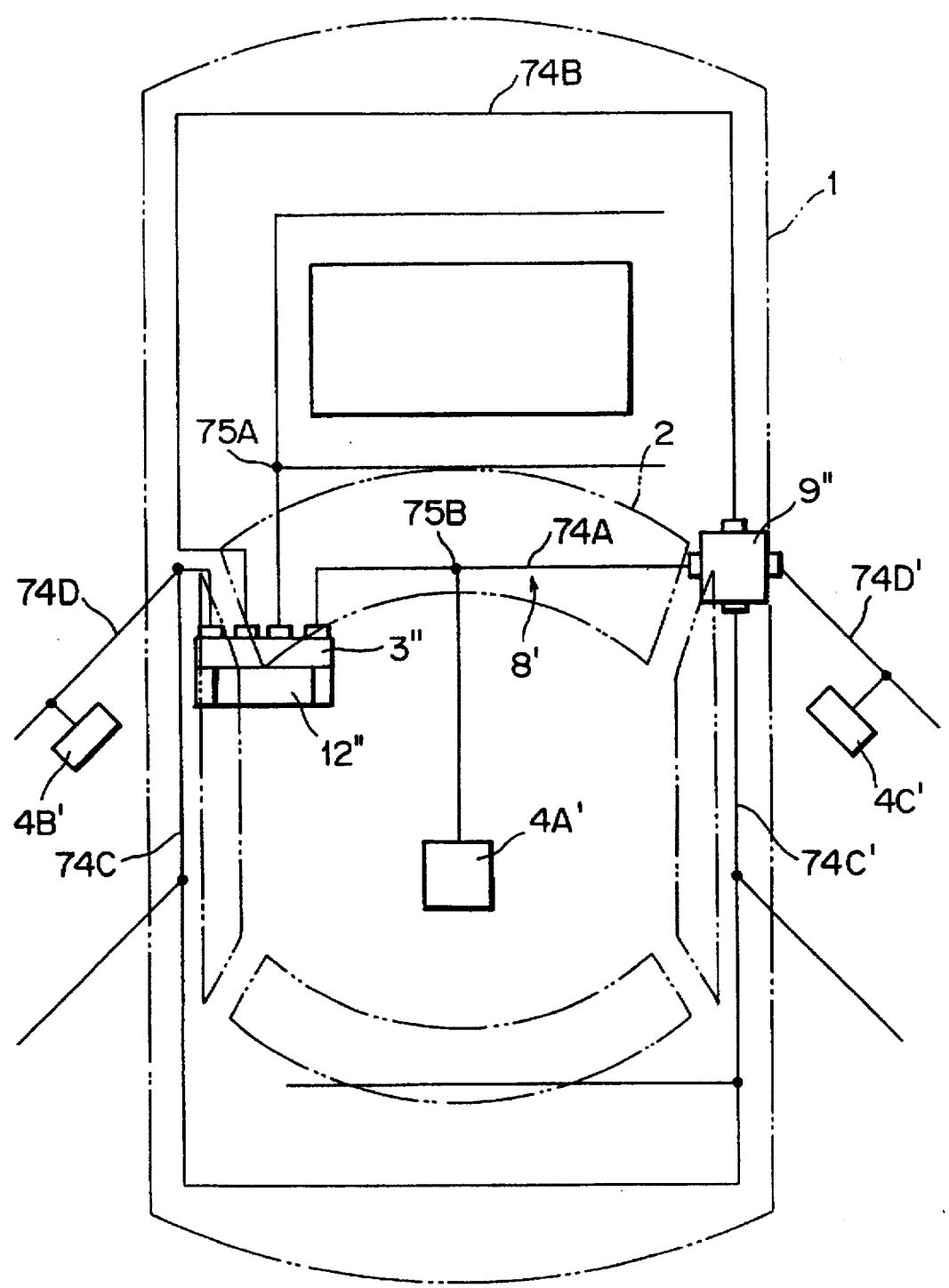
FIG. 15 is a view of a wired state of internal wiring harnesses with the meter module 3" of FIG. 12 used.

FIG. 15 shows an example of wiring harnesses wired inside a vehicle with the meter module 3" of this embodiment employed.

In the figure, designated 4A'-4C' are relays, circuit control units or electric junction boxes as in FIG. 1 and 9" is a main electric junction box of a known construction carrying a number of fuses, relays and the like. In other words, on the left and right sides of the dashboard 2 a meter module 3" and the above main electric junction box 9" are respectively disposed; at a position therebetween the seat module 4A' is disposed for controlling optional electric equipment of various kinds; and on the left and right doors the door module 4B' for a driver and the door module 4C' for an assistant driver are respectively disposed.

Figure 33:
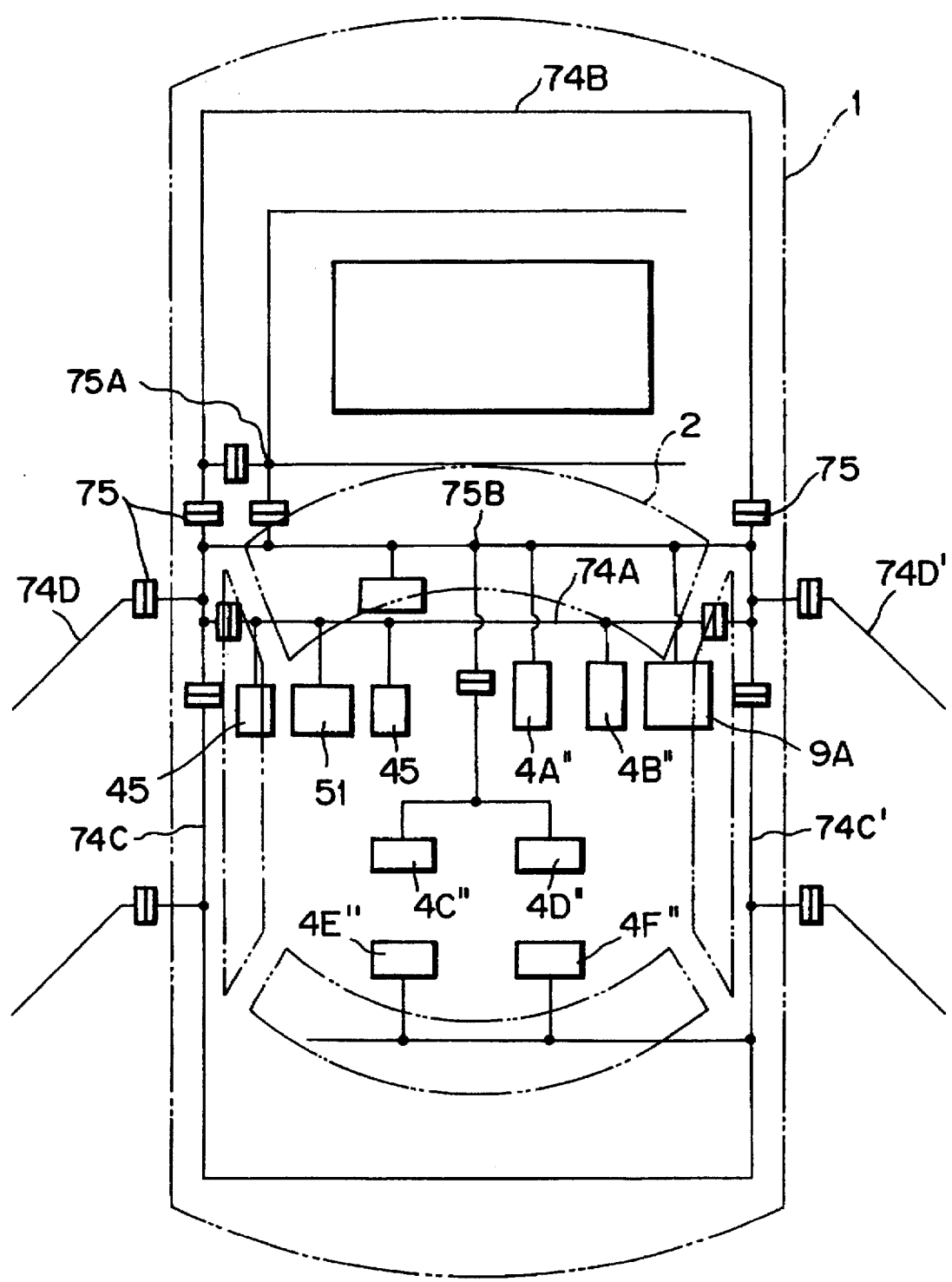
FIG. 33 is a view showing a conventional wired state of wiring harneses.

As is apparent from comparison with the prior art-showing FIG. 33, due to the meter module 3" of this invention adopted, the wiped state around the dashboard 2 is very much simplified.

Figure 16:
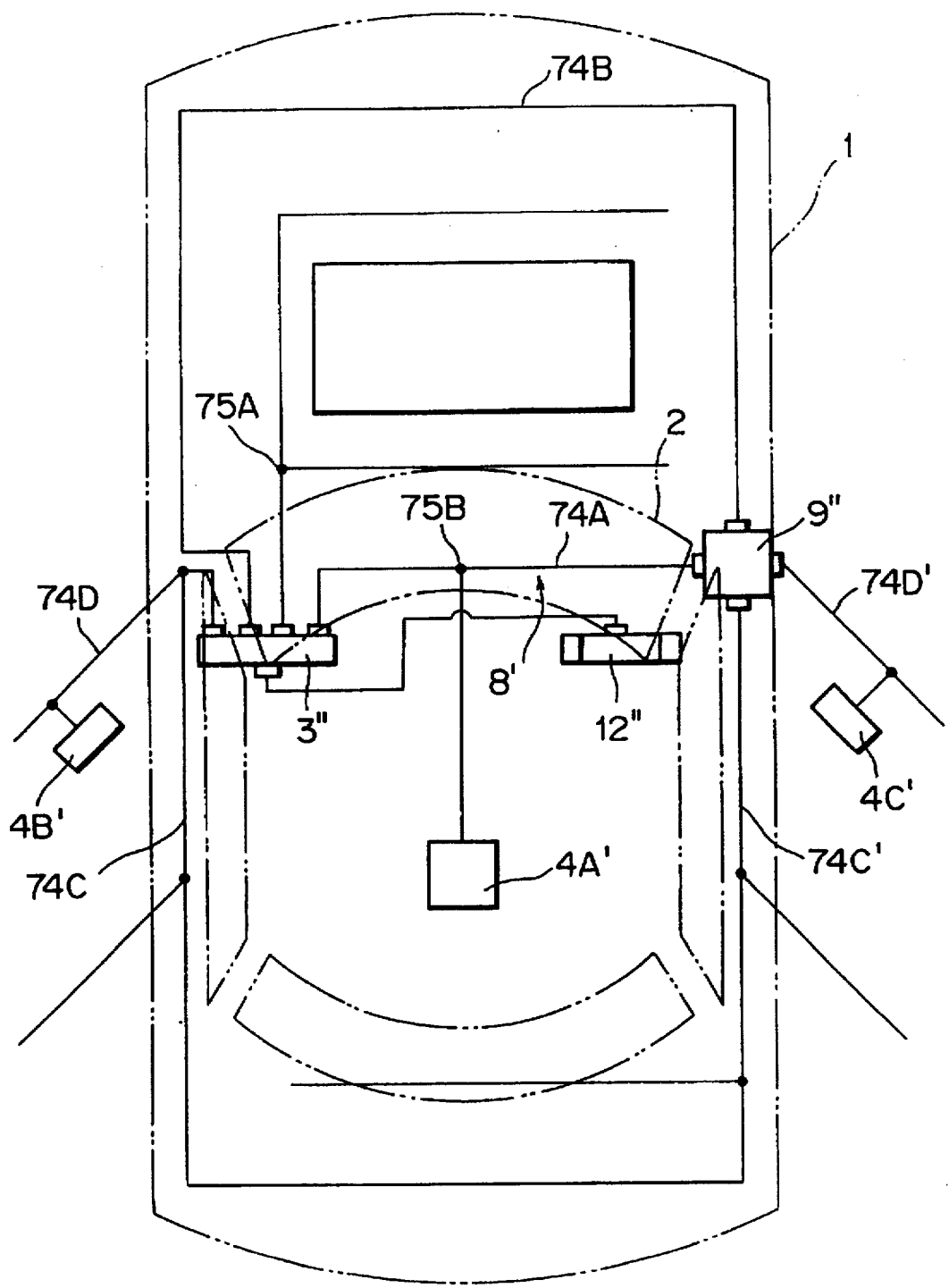
FIG. 16 is a view of another wired state of internal wiring harnesses with the meter module 3" of FIG. 12 used.

FIG. 16 shows a modified embodiment of FIG. 15. As is apparent from this figure, where the position of the steering wheel is switched from left to right it is only necessary to remove the instrument panel 12" from the meter module 3" and dispose it on the right side, making it possible to attain the end with little changing the wired state of the wiring harnesses.

Figure 17:
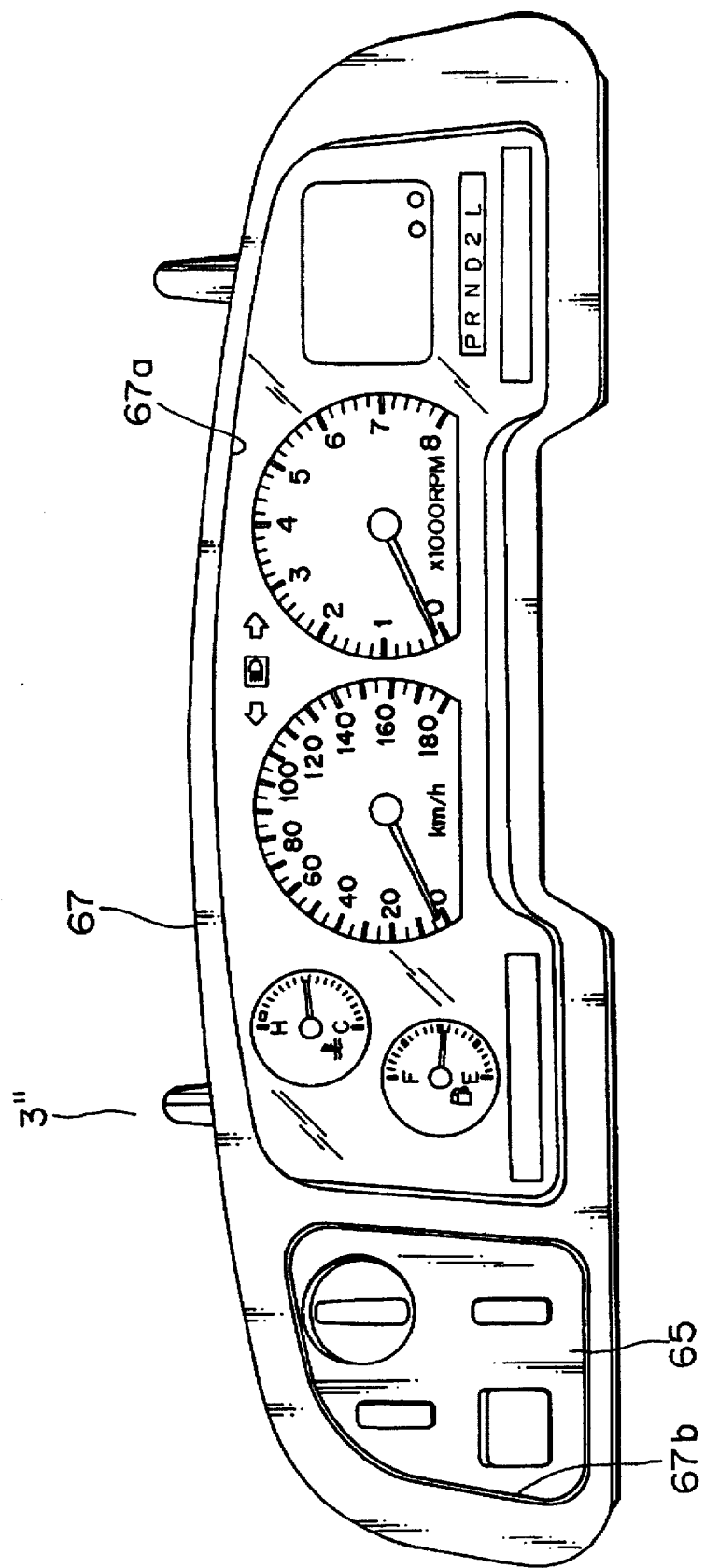
FIG. 17 is a front view of the meter module 3" of FIG. 12.
Figure 18:
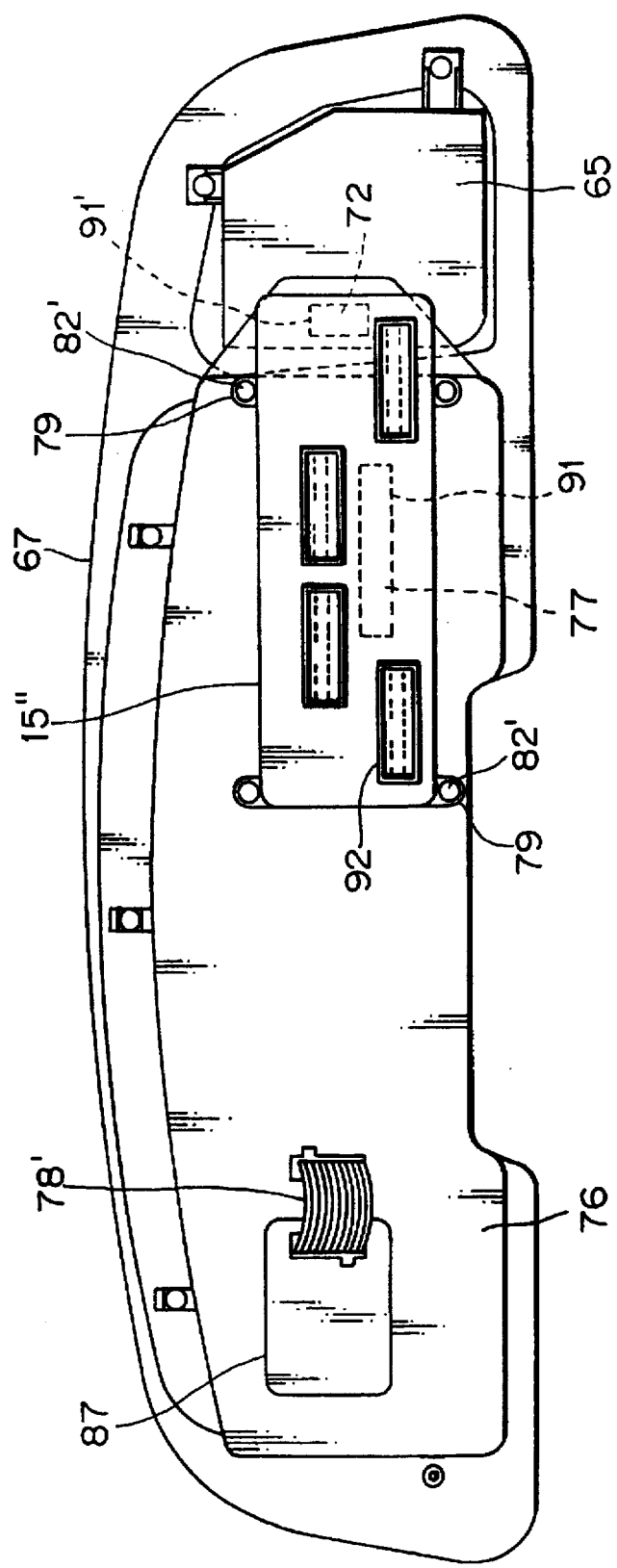
FIG. 18 is a rear view of the meter module 3" of FIG. 12.
Figure 19:
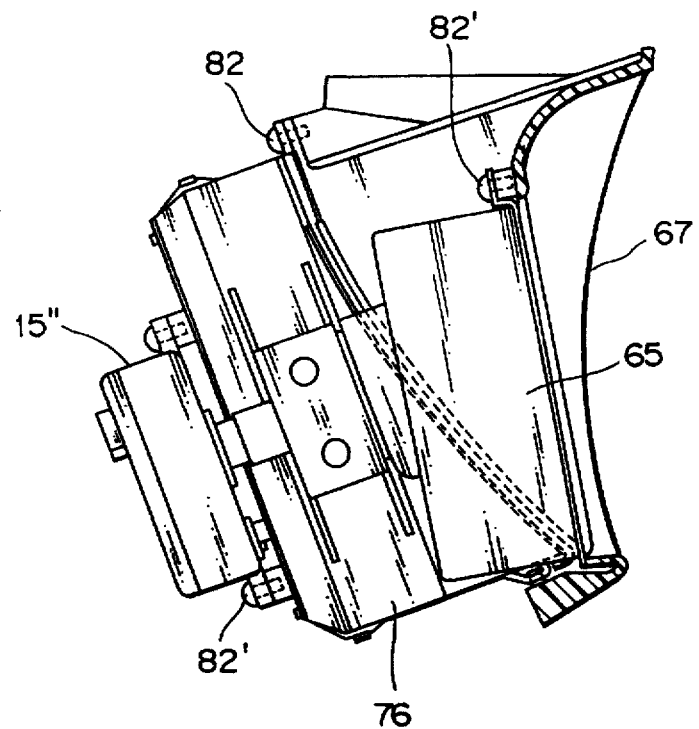
FIG. 19 is a right side view of the meter module 3" FIG. 12.
Figure 23:
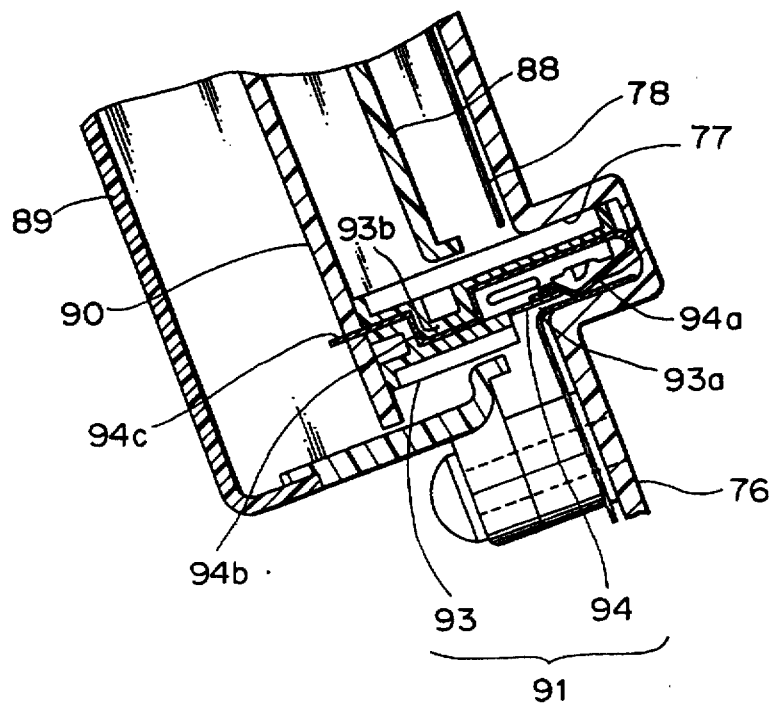
FIG. 23 is an enlarged sectional view of an essential portion of FIG. 22.
Figure 22:
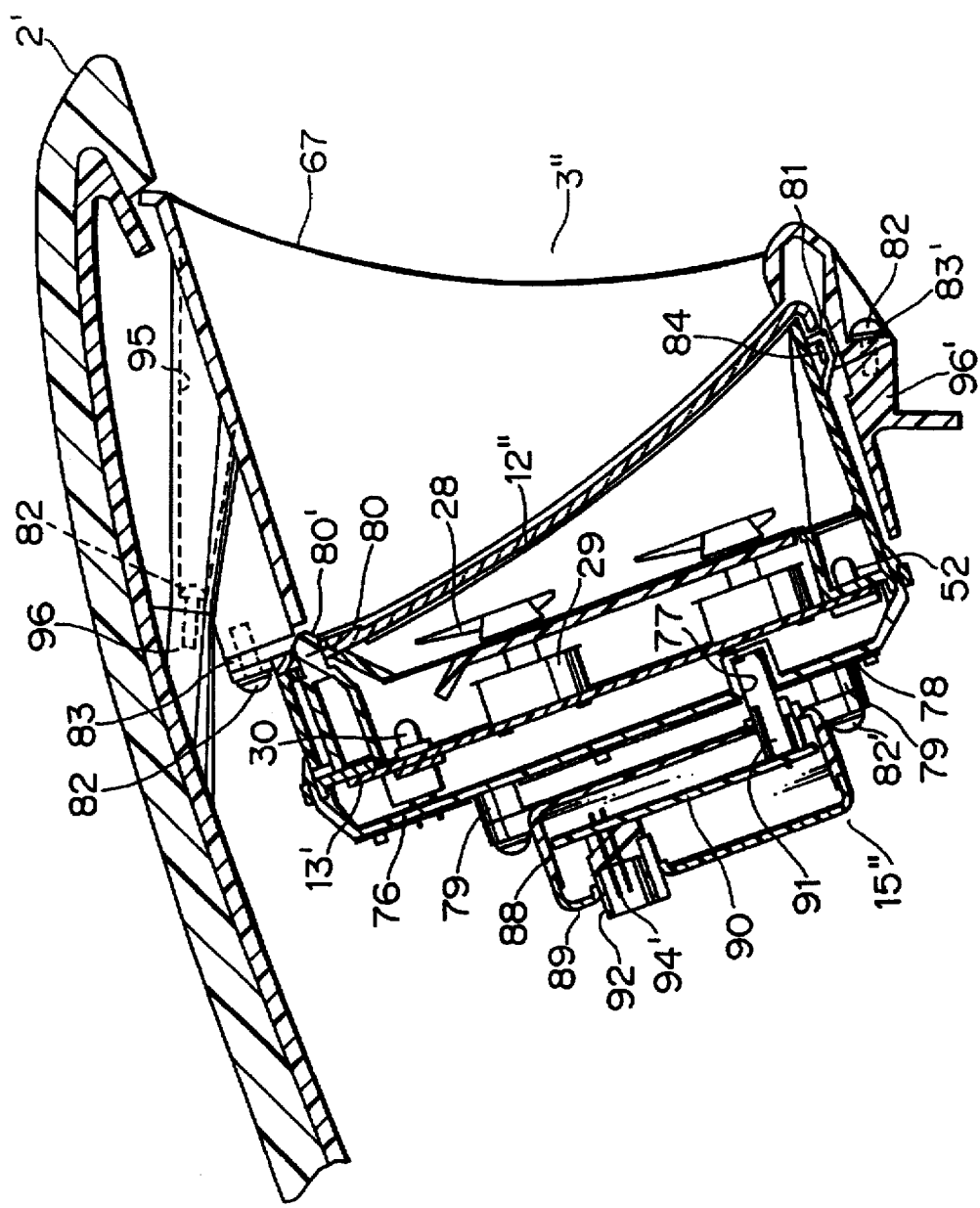
FIG. 22 is a sectional view of the meter module 3" installed in the dashboard 2'.

FIG. 17 is a front view of the meter module 3", FIG. 18 is its rear view, FIG. 19 is its right side view, FIG. 20 is a side view of the module of FIG. 19, shown exploded, FIGS. 21A and 21B are front and side views of the switch unit 65, FIG. 22 is a sectional view of the meter module 3" and the dashboard 2' assembled, and FIG. 23 is a segmentary enlarged sectional view of FIG. 22.

The finish panel 67 is on one side formed with an indication window 67a for the instrument panel and on the other side with a window 67b for the switch unit. The switch unit 65 mounted in this window 67b, as shown in FIGS. 21A and 21B, is constituted by upper and lower cases 68 and 69 and printed circuit boards 70 and 70' housed in the upper and lower cases, the printed circuit boards forming switch circuits for various switches 16A'–16D' arranged at the front of the upper case 68. At its rear, the lower case 69 has a projected portion 71 provided with a with-junction box-connected connector 72 communicated with the internal printed circuit boards 70 and 70'. On its outer periphery the lower case 69 is formed with mounting plates 73 each with a screw hole.

The instrument panel 12' mounted in the indication window 67a, as shown in FIG. 22, is provided with a meter case 76 for housing the drive circuit board 13' therein.

On one side of the rear surface of the meter case 76, a recessed connector 77 for connection with the electric junction box 15" is provided and on the other side a projected LCD message-forming frame 87 (see FIG. 18) is provided. A flexible printed circuit board (FPC) 78 extending from the internal drive circuit board 13' is wired into the connector 77 with its copper foil conductor on the front surface. Bosses 79 for positioning and fixing the electric junction box are projectingly provided substantially around the connector 77. Further, at an upper portion of the front of the meter case 76, a positioning pin 80 for the finish panel 67 is provided and at a lower portion a pin hole 81 for a dowel pin 84 of the finish panel 67 is provided. On one side surface 76a of the meter case 76, a mounting guide 85 for the projected portion 71 of the switch unit 65 is provided.

At the front of the instrument panel 12", meters 28 are implemented as in the case of FIG. 8 and on the drive circuit board 13' movements 29 for the meters 28 and the illuminating bulb 30 are fixed. Designated 78' is a ribbon circuit for connecting the above LCD message and the internal drive circuit board 13'.

The electric junction box 15" consists of upper and lower cases 88 and 89 and a centralized control circuit board 90 housed therein, the circuit board 90 having a so-called functional circuit incorporated therein. The upper case 88 has a with-instrument panel-connected connector 19 and a with-switch unit-connected connector 91'. The lower case 89 is provided with a plurality of onnectors 92 for connection with wiring harnesses.

The with-instrument panel-connected connector 91, as shown in FIG. 23, consists of an insulating housing 93 and a so-called face-contact terminal 94 directly attached to a circuit conductor of the centralized control circuit board 90. The face-contact terminal 94 has at one end thereof a folded resilient tongue 94a, at the other end a connection piece 94c, and at an intermediate position a convex-shaped stress-absorbing portion 94b. The connection piece 94c is soldered to the above-mentioned circuit conductor and the resilient tongue 94a is exposed from a side-wall opening 93a of the insulating housing 93, while the intermediate stress-absorbing portion 94b is fitted over a housing-side engagement portion 93b, so that stresses as in fitting and detaching the connector 91 will not be imposed on the solder between the connection piece 94c and the circuit conductor.

Although the other connectors 91' and 92 are shown in the figures as comprising pin terminals 94' for simplifying the drawings, it is preferred that they also be of the same construction as that of the connector 91.

The meter module 3" is assembled and mounted in the dashboard 2' as follows.

As shown in FIG. 20, the projected portion 71 of the switch unit 65 is held from sideways to the mounting guide 85 on the one side of the meter case 76 of the instrument panel 12" and fastened with a not-shown screw. The electric junction box 15" is then fastened to the bosses 79 on the rear surface of the meter case 76 with screws 82', whereby the with-instrument panel-connected connectors 91 of the electric junction box 15" is connected with the connector 77 of the instrument panel 12" and the with-switch unit-connected connector 91' with the connector 72 of the switch unit 65. The connector 91 is fitted in the recessed connector 77 to bring the resilient tongue 94a of the terminal 94 into face-contact with the copper foil conductor of the FPC 78 on the rear surface of the meter case 76 as shown in FIG. 23.

The instrument panel 12" the electric junction box and the switch unit 65 are thus united into the cluster module 66.

The above cluster module 66 is fixed to the finish panel 67 to complete the assembly of the meter module 3".

In other words, the dowel pin 84 at the lower portion of the finish panel 67 is placed into the pin hole 81 of the meter case 76 for positioning. The case 76 is then rotated to the finish panel 67 to have the positioning pin 80 inserted into a hole 80' in the panel 67. The meter case 76 is then fastened to a mounting seat 83 with a screw 82 and the mounting plates 73 of the switch unit 65 to the finish panel 67 with screws 82'.

The meter module 3" is installed in the dashboard 2' as follows. On opposite sides on its upper frame, the finish panel 67 is provided with screw holes 95, 95 outwardly diverging relative to each other as shown in FIG. 13. The meter module 3" is mounted in the dashboard 2' from front and, as shown in FIG. 22, fastened, via the screw holes 95, to a boss 96 inside the dashboard with a screw 82. The mounting seat 83' at a finish panel lower portion is fastened to a corresponding boss 96' at a dashboard lower portion to complete the installation. Thereupon, to the connectors 92 on the rear surface of the electric junction box 15" are coupled the terminal connectors (not shown) of the dashboard harness 8', cowl-side wiring harness 74A, engine room main wiring harness 74B and the like as shown in FIG. 15 to make the electric connection of the meter module 3".

Thus, the assembly and installation in the dashboard 2' of the cluster module 66 or meter module 3" is very easily attained, and its connection with the various wiring harnesses 8', 74A and 74B is likewise easily attained.

Figure 25:
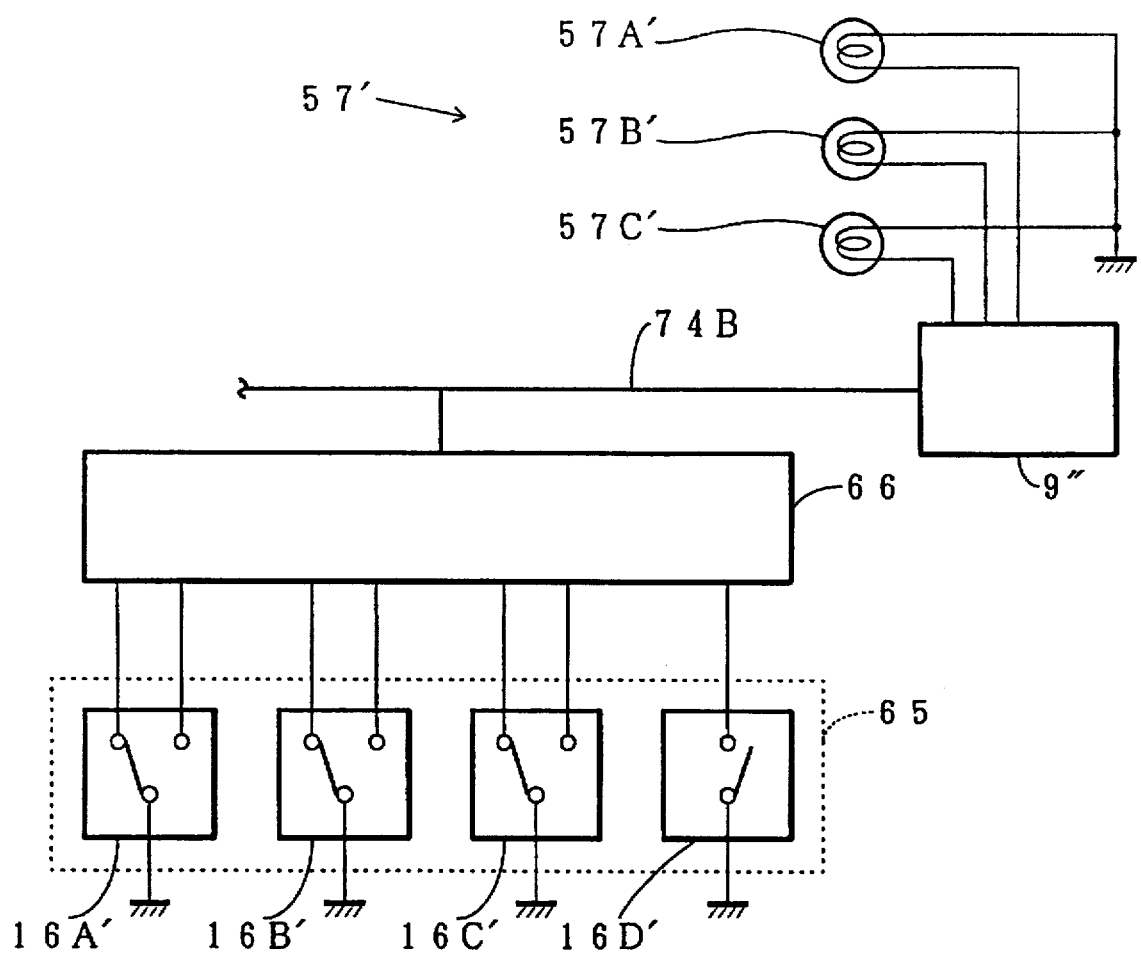
FIG. 25 is a wiring diagram of a switch circuit portion of FIG. 24.

FIG. 24 is a block wiring diagram of the meter module 3" and FIG. 25 a wiring diagram of a switch circuit portion of same.

In FIG. 24, designated 45' are generating means of various signals, 46A is an input I/F circuit, 46B an output I/F circuit, 47' a CPU and 50A' to 50D' various driver circuits.

The electric junction box 15" incorporates therein a functional circuit (signal converter by multiple transmission) by the above-referenced lowering of current and has the centralized control circuit board 14 (14') and the electric junction box 15 (15') as in FIGS. 1 and 11 united. The various switches 16A'–16D' are also united as a switch unit 65. Consequently, as compared with FIG. 9, the switch unit 65 is directly connected to the CPU 47' allowing the sub-wiring harnesses 17, 17' to be omitted. In FIG. 25, designated 57A'–57C' are lamps such as a head lamp and fog lamp.

Figure 26:
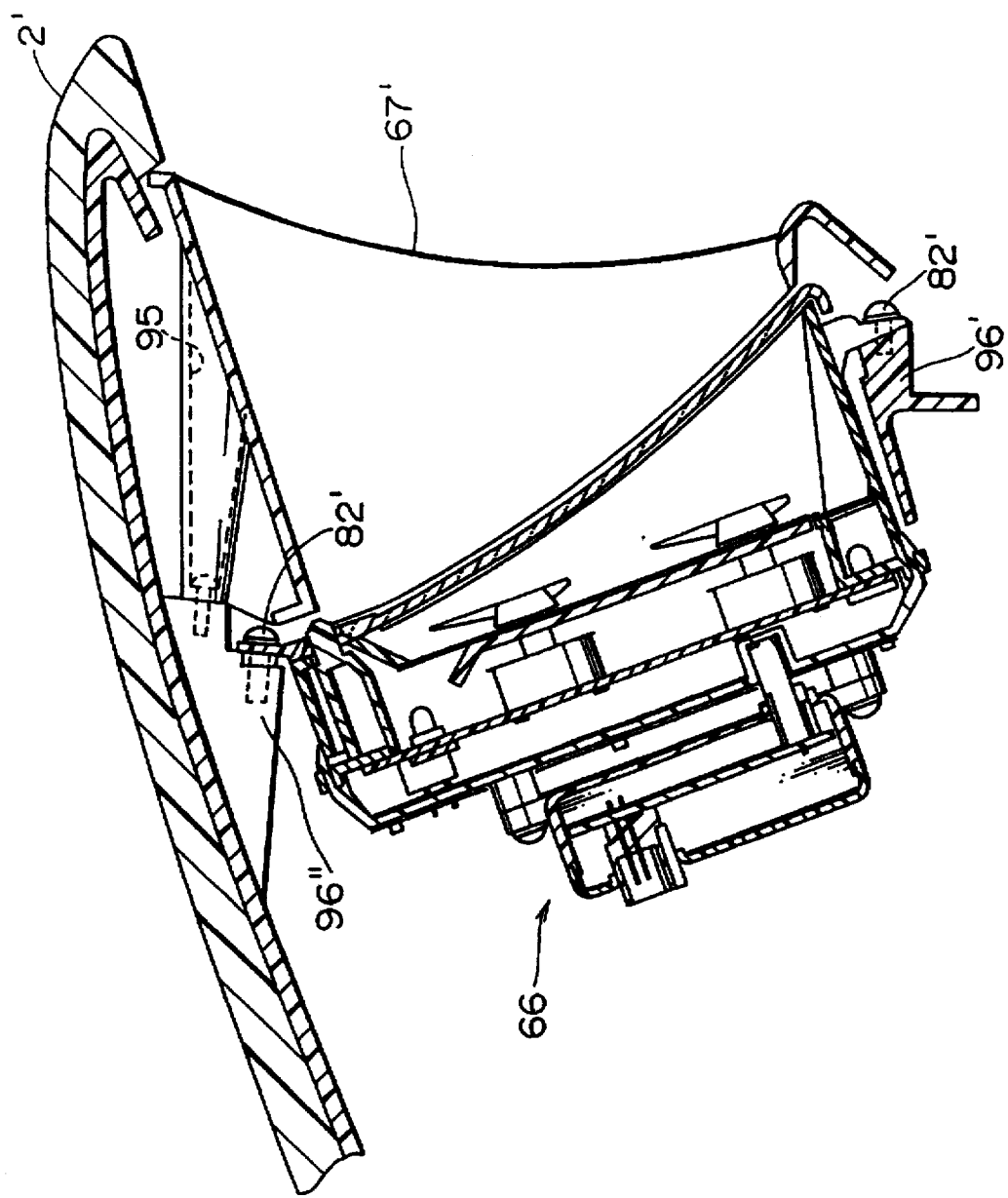
FIG. 26 is a view showing a modified embodiment of the meter module 3" of FIG. 12.

FIG. 26 shows a modified embodiment of the meter module 3" shown in FIGS. 12 to 25, in which the finish panel 67' is produced as a completely separated part from the cluster module 66. In this case, the cluster module 66 is first fastened, with screws 82', to the upper and lower bosses 96' and 96" on the front side of the dashboard. The finish panel 67' is then coveringly fixed to the dashboard 2'.

Figure 27:
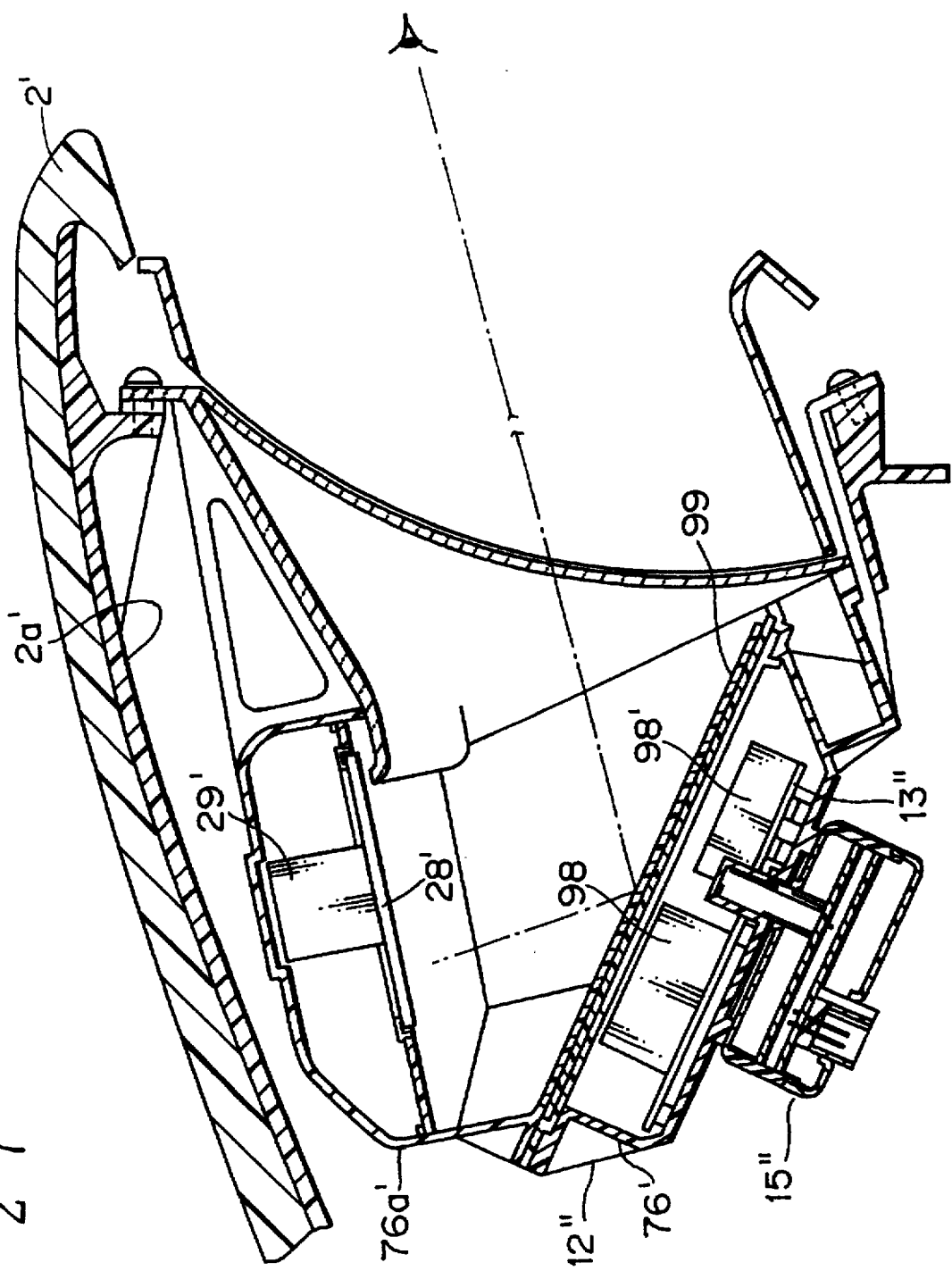
FIG. 27 is a view showing a modified embodiment of the meter module of FIG. 26.

FIG. 27 further shows a modified embodiment of FIG. 26, in which a case extended portion 76a'—which extends from the meter case 76' of the instrument panel 12"—is disposed inside an inner ceiling wall 2a' of the dashboard, the extended portion 76a' accommodating a meter indication portion 28' for indicating letters, symbols and the like and a fluorescent indicator 29'. Further, indication portions 98, 98' for indicating an LCD message and the like are fixed to the drive circuit board 13" inside the meter case 76', and a half mirror 99 is disposed at the front of the case, so that a driver may view the indication on the meter indication portion 28' via reflected light on the half mirror 99 and the information displayed on the indication portions 98, 98' via light passing through the half mirror.

To attain the above display, the instrument panel is not limited to have the above construction, and those shown in Japanese Utility Model and Patent Application Laid-Open Specifications Nos. Hei 3-122921 and Hei 3-273943 may be used.

Figure 28:
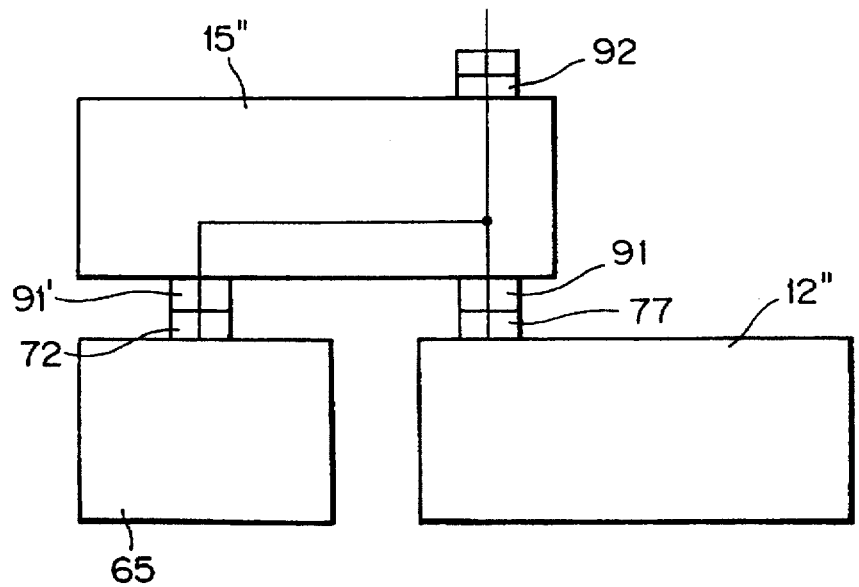
FIG. 28 is a block wiring diagram showing the instrument panel 12" of the meter module 3", electric junction box 15" and switch unit 65 mutually connected.

FIG. 28 is a block wiring diagram showing the connection of the instrument panel 12", the electric junction box 15" and the switch unit 65 in the meter module 3". As is apparent from this figure, even when signals as for night lighting are transmitted from the switch unit 65, the signals have been transmitted from the switch unit 65 to the instrument panel 12" via the electric junction box 15".

Of these signals, however, some do not require to be transmitted via the electric junction box 15". Further, if every signal is transmitted via the junction box 15", the number of circuit connections increases, resulting in the reliability lowered and the cost raised. In addition, when the with-instrument panel-connected connector 91 and the with-switch unit-connected connector 91' on the electric junction box 15" are connected respectively with the corresponding connectors 77 and 72, the positioning and the like required lead to a lowered operability in assembly.

Figure 29:
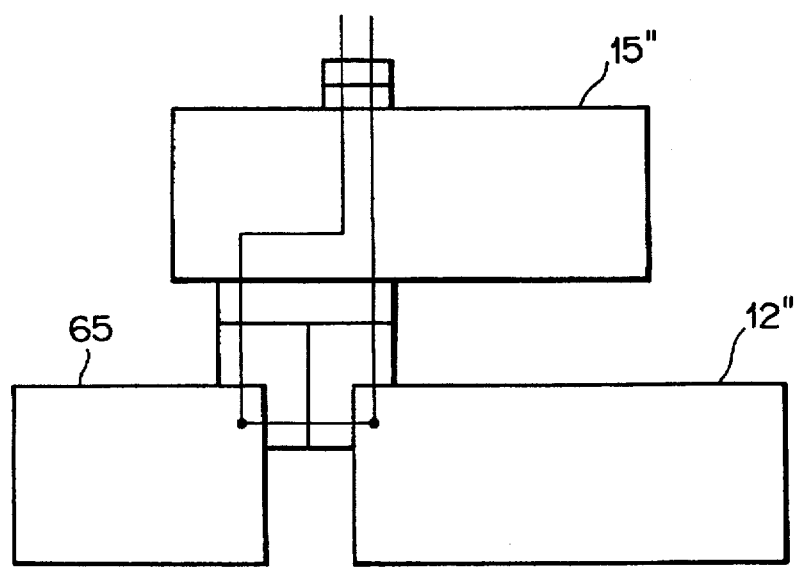
FIG. 29 is an improved block wiring diagram of FIG. 28.
Figure 30:
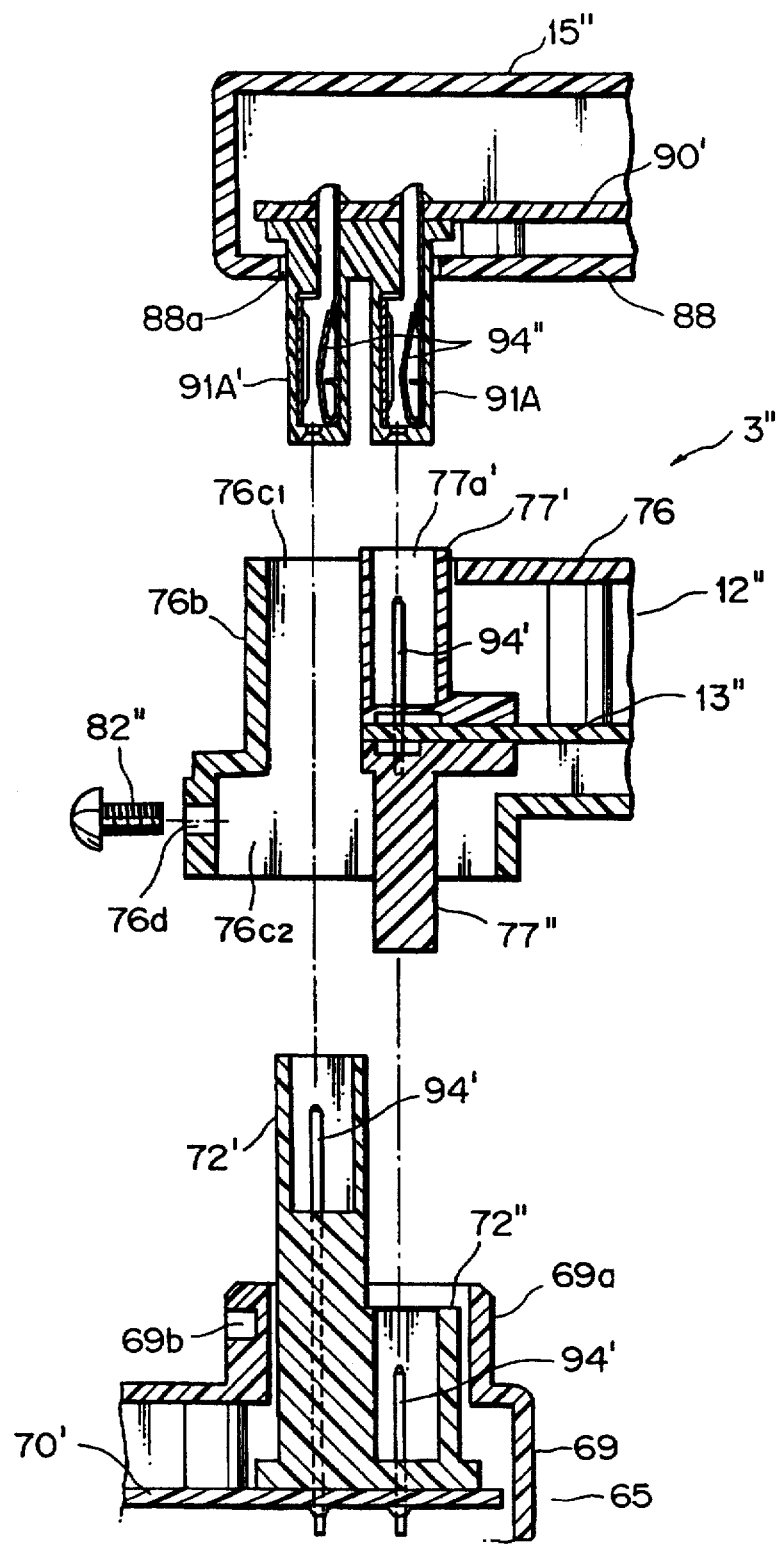
FIG. 30 is a sectional view of essential portions of the instrument panel 12", electric junction box 15" and switch unit 65 of FIG. 28, shown separated to show a structure through which they are connected.
Figure 31:
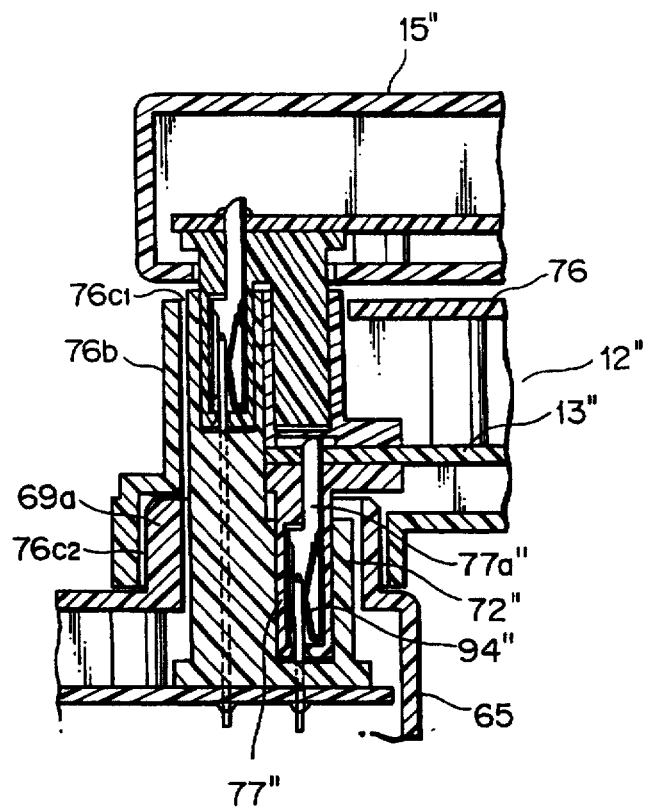
FIG. 31 is a sectional view showing the portions of FIG. 30 assembled.
Figure 32:
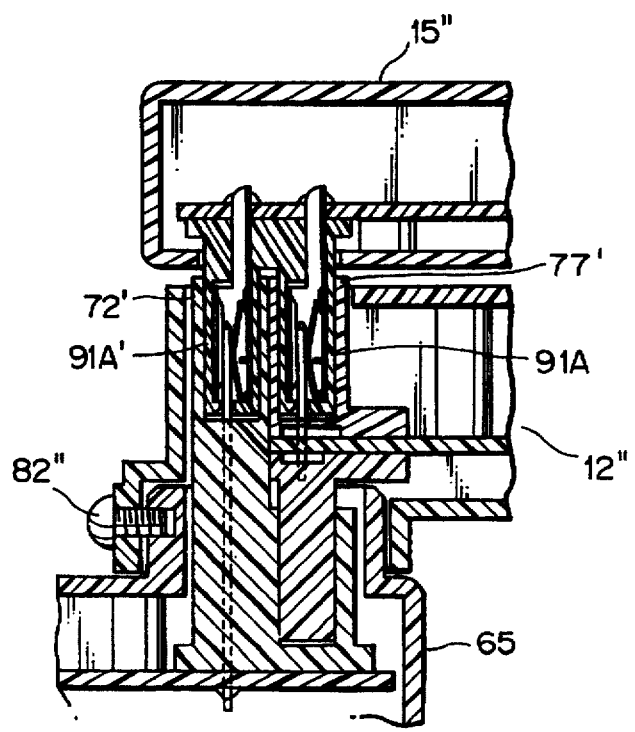
FIG. 32 is a sectional view showing other portions of FIG. 30 assembled.

It is therefore preferable that the circuits between the instrument panel 12", the electric junction box 15" and the switch unit 65 be collected at one place as shown in FIG. 29 and connector-connected. FIGS. 30 to 32 show an embodiment therefor.

In FIG. 30, the meter case 76 of the instrument panel 12" in the meter module 3" has a unit-mounting frame 76b bulgedly formed on one side thereof. The unit-mounting frame 76b is provided with an upper opening 76c1 and a larger lower opening 76c2, and through a lateral wall on the side of the lower opening 76c2 a screw-insertion hole 76d is formed.

On the other hand, the internal drive circuit board 13" has its one end extended to the unit-mounting frame 76b, and on one surface of the extended portion a with-junction box-connected connector 77' is provided upright and on the other surface thereof a with-switch unit-connected connector 77" is provided downwardly extended. Terminal-accommodating chambers 77a' and 77a" respectively formed in the connectors 77' and 77" are arranged zigzag relative to each other, and in the chamber 77a' a pin terminal 94' is provided for connection with a circuit conductor (not shown) of the drive circuit board 13" and in the chamber 77a" a female terminal 94" is provided.

The upper case 88 of the electric junction box 15" has an opening 88a formed in one side thereof, in which a with-instrument panel-connected connector 91A and a with-switch unit-connected connector 91A' are projectingly provided in a row, the connectors 91A and 91A' each containing a female terminal 94" directly connected to a circuit conductor (not shown) of the internal centralized control circuit board 90'. Likewise, the lower case 69 of the switch unit 65 has a fitting frame 69a projectingly formed thereon, which corresponds to the lower opening 76c2 of the unit-mounting frame 76b. The fitting frame 69a has a threaded hole 69b in a lateral wall thereof, which corresponds to the screw insertion hole 76d. In the fitting frame 69a a with-junction box-connected connector 72' and a with-instrument panel-connected connector 72" are provided stepwise relative to each other, the connectors 72' and 72" each containing a pin terminal 94' directly connected to the internal printed circuit board 70'. Stated differently, the with-junction box-connected connector 72' is projected from the fitting frame 69a.

FIGS. 31 and 32 are sectional views showing the above electric junction box 15", instrument panel 12" and switch unit 65 in the process of being assembled.

The fitting frame 69a of the switch unit 65 is fitted in the lower opening 76c2 of the unit-mounting frame 76b of the meter case 76, followed by fixing the switch unit 65 to the instrument panel 12" with a screw 82" (screw insertion hole 76d, threaded hole 69b). Thereon, as shown in FIG. 31, the with-switch unit-connected connector 77" of the instrument panel 12" is fitted in and connected with the connector 72" of the switch unit 65.

Thereafter, the with-instrument panel-connected connector 91A and the with-switch unit-connected connector 91A' of the electric junction box 15" are inserted into the upper opening 76c1 of the unit-mounting frame 76b and connected with the corresponding connector 77' of the instrument panel 12" and connector 72' of the switch unit 65.

As shown in FIGS. 30 to 32, the circuits between the instrument panel 12", the electric junction box 15" and the switch unit 65 are simultaneously connector-connected by making use of the unit-mounting frame 76b provided on the instrument panel 12", advantageously leading to a decrease in the internal circuits of the electric junction box 15, an enhanced reliability on circuit connection and an improved operability in assembly.

As mentioned above, this invention has the following features and advantages. Since the meter module of this invention comprises an instrument panel with meters/indicating lamps and their drive circuits implemented therein, a centralized control circuit board provided with a control circuit for vehicle-mounted electric equipment including the meters/indicating lamps, and an electric junction box that distributes power sources and input/output signals for the vehicle-mounted electric equipment and integrates ground wires, which instrument panel, centralized control circuit board and junction box are gathered and integrally united, the meter module may be easily adapted to a change in type and grade of a vehicle and to an addition of electric equipment and remarkably simplifies the wired state around the dashboard. As a result, the wiring and installation are facilitated, leading to an improved productivity of automobiles and a lowered cost.

Further, since an instrument panel with meters/indicating lamps and their drive circuits implemented therein, an electric junction box with a functional circuit incorporated therein for distributing electric supplies and input/output signals for the vehicle-mounted electric equipment including the meters/indicating lamps and controlling the vehicle-mounted electric equipment, and a switch unit incorporating therein switches for the vehicle-mounted electric equipment are gathered and integrally united, the meter module is made light and compact and puts the sub-wiring harness in disuse, further facilitating installation to the dashboard and wiring of wiring harnesses in the dashboard.

What is claimed is:

1. A meter module comprising:

an instrument panel implemented with meters/indicating lamps and a drive circuit board provided with drive circuits therefor;

a centralized control circuit board having a control circuit for vehicle-mounted electric equipment including said meters/indicating lamps;

an electric junction box distributing an electric supply and input/output signals for said vehicle-mounted electric equipment; and means for connecting said instrument panel, said centralized control circuit board and said electric junction box.

2. A meter module according to claim 1, wherein said instrument panel, said centralized control circuit board and said electric junction box are connected by paid means for connecting as a cluster adapted to be received in a rear frame to be installed in a dashboard.

3. A meter module according to claim 1 or 2, wherein said centralized control circuit board and said electric junction box each respectively include a first connecting means for connecting a corresponding one of paid centralized control circuit board and said electric junction box to a dashboard wiring harness and a second connecting means for connecting a corresponding one of said centralized control circuit board and said electric junction box to a sub-wiring harness composed mainly of a power line, whereby connection between said sub-wiring harness and said electric junction box enables said sub-wiring harness to include a part of power line circuits between said dashboard wiring harness and said electric junction box.

4. A meter module comprising:

an instrument panel implemented with meters/indicating lamps and a drive circuit therefor;

an electric junction box with a functional circuit incorporated therein for distributing an electric supply and input/output signals for vehicle-mounted electric equipment including said meters/indicating lamps and controlling the vehicle-mounted electric equipment; and a switch unit with switches for said vehicle-mounted electric equipment incorporated therein, said instrument panel, said electric junction box and said switch unit being gathered and integrally united.

5. A meter module according to claim 4, wherein said electric junction box includes a first connector member for connecting said electric junction box to said instrument panel and a second connector member for connecting said electric junction box to said switch unit, and said instrument panel and said switch unit each includes respective connecting means for connection to said first connector member and to said second connector member.

6. A meter module according to claim 1, wherein said drive circuit board, said centralized control circuit board and said electric junction box each has major surfaces thereof disposed substantially in parallel with each other and are disposed in face-to-face relation, with said centralized control circuit board located between said drive circuit board and said electric junction box.

7. A meter module according to claim 6, wherein said electric junction box comprises busbar circuit boards arranged in a stack in an insulating case, said busbar circuit boards each comprising an insulating substrate and a plurality of busbars disposed thereon.

8. A meter module according to claim 3, wherein said first connecting means of said centralized control circuit board comprises a connector projecting from a major surface of said centralized control circuit board to pass through an opening in said electric junction box.

9. A meter module according to claim 3, wherein said first and second connecting means of said electric junction box each comprises a connector provided on a major surface of said electric junction box.

10. A meter module according to claim 9, wherein said sub-wiring harness includes a connector for connecting said sub-wiring harness to said dashboard wiring harness, said connector of the sub-wiring harness adapted to be attached to said major surface of said electric junction box.

11. A meter module according to claim 6, wherein said drive circuit board has a connector provided on a major surface thereof for electrically connecting said drive circuit board to said centralized control circuit board.

12. A meter module according to claim 5, wherein said electric junction box further includes a third connector member for connecting said electric junction box to a dashboard wiring harness.

13. A meter module according to claim 5, wherein said instrument panel and said switch unit are disposed in side-to-side relation while said electric junction box is disposed in face-to-face relation to said instrument panel and said switch unit, with said first and second connector members provided on a surface of said electric junction box, which is opposed to said instrument panel and said switch unit.

14. A meter module according to claim 4, wherein said instrument panel includes a meter case with an extended portion accommodating therein an indicator, an indication portion inside said meter case, and a half mirror disposed at a front of said meter case, said extended portion, said indication portion and said half mirror being disposed relative to each other such that a driver views an indication on said indicator via reflected light on said half mirror and an indication on said indication portion via light passing through said half mirror.

15. A meter module according to claim 4, wherein said electric junction box and said instrument panel, said instrument panel and said switch unit, and said switch unit and said electric junction box are mutually electrically connected.

16. A meter module according to claim 15, wherein said instrument panel includes a meter case, said meter case having a unit-mounting frame opened upwardly and downwardly, through which said electric junction box and said switch unit are mutually connected, and first and second connectors on opposite sides thereof for connection to corresponding connectors of said electric junction box and said switch unit concurrently with connection of said electric junction box and said switch unit.

* * * * *